(12) United States Patent
Sasaki

(10) Patent No.: US 9,797,331 B2
(45) Date of Patent: Oct. 24, 2017

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Keisuke Sasaki, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/219,728

(22) Filed: Jul. 26, 2016

(65) Prior Publication Data

US 2017/0030283 A1 Feb. 2, 2017

(30) Foreign Application Priority Data

Jul. 28, 2015 (JP) .................................. 2015-148803

(51) Int. Cl.
| | |
|---|---|
| *F02D 41/24* | (2006.01) |
| *F02D 41/14* | (2006.01) |
| *F02D 41/22* | (2006.01) |
| *F02D 35/02* | (2006.01) |

(52) U.S. Cl.
CPC ....... *F02D 41/2438* (2013.01); *F02D 35/023* (2013.01); *F02D 35/028* (2013.01); *F02D 41/1488* (2013.01); *F02D 41/22* (2013.01); *F02D 2041/1432* (2013.01)

(58) Field of Classification Search
CPC ...... F02D 35/023; F02D 41/28; F02D 35/028; F02D 41/38; F02D 41/008; F02D 41/22; F02D 2041/228; F02D 2041/286; F02D 2041/1418; F02D 41/1401; F02D 37/02; F02P 5/1512; F02P 5/045; G01L 19/04; G01L 23/24
See application file for complete search history.

(56) References Cited

U.S. PATENT DOCUMENTS

| | | | |
|---|---|---|---|
| 2006/0129304 A1 | 6/2006 | Takemura et al. | |
| 2008/0319632 A1 | 12/2008 | Miyashita et al. | |
| 2010/0241333 A1* | 9/2010 | Moriya | F02D 11/10 701/101 |
| 2016/0123247 A1* | 5/2016 | Mizoguchi | B60W 10/06 123/406.55 |
| 2016/0160776 A1* | 6/2016 | Yeager | F02D 35/023 123/435 |

(Continued)

FOREIGN PATENT DOCUMENTS

| | | |
|---|---|---|
| JP | 2004-353531 A | 12/2004 |
| JP | 2006-169996 | 6/2006 |

(Continued)

*Primary Examiner* — Hung Q Nguyen
*Assistant Examiner* — Xiao Mo
(74) *Attorney, Agent, or Firm* — Andrews Kurth Kenyon LLP

(57) ABSTRACT

A control apparatus for an internal combustion engine is configured to: calculate measured data of MFB using an output signal of an in-cylinder pressure sensor after performing a first low-pass filtering; execute engine control based on the measured value of a specified fraction combustion point that is calculated based on the measured data of MFB; and prohibit the engine control when the first correlation index value is less than a first determination value and a first correlation degree is lower than a first degree.

6 Claims, 10 Drawing Sheets

(56) References Cited

U.S. PATENT DOCUMENTS

| | | | | |
|---|---|---|---|---|
| 2016/0237923 | A1* | 8/2016 | Kitagawa | F02D 35/023 |
| 2016/0369727 | A1* | 12/2016 | Kitagawa | F02D 41/30 |
| 2017/0009672 | A1* | 1/2017 | Sasaki | F02D 41/26 |
| 2017/0022911 | A1* | 1/2017 | Kitagawa | F02D 35/023 |
| 2017/0037791 | A1* | 2/2017 | Kitagawa | F02D 35/023 |

FOREIGN PATENT DOCUMENTS

| | | |
|---|---|---|
| JP | 2008-069713 A | 3/2008 |
| JP | 2012-077729 | 4/2012 |
| JP | 2014-025380 A | 2/2014 |

\* cited by examiner

Fig. 6A
Reference waveform
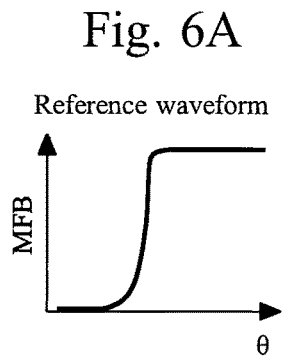
×
Fig. 6B
Measured waveform Noise
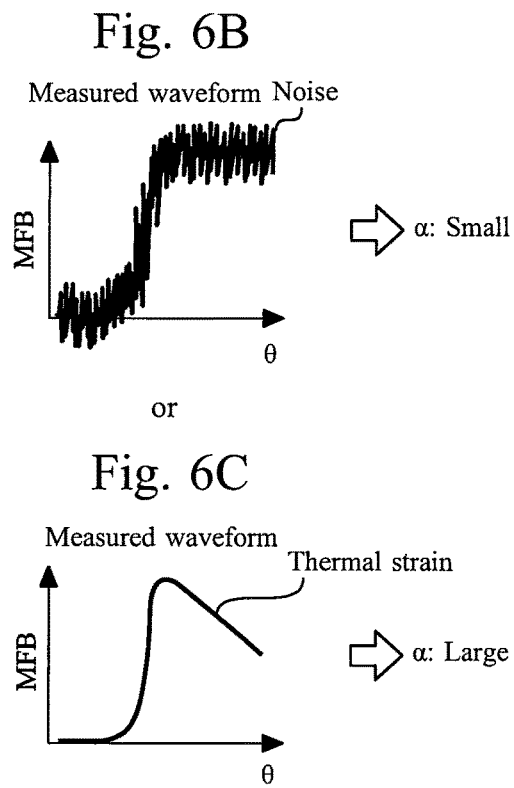
⇨ α: Small
or
Fig. 6C
Measured waveform
Thermal strain
⇨ α: Large
Fig. 7A
Reference waveform
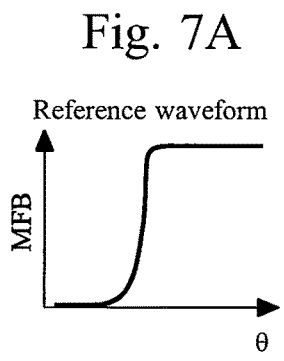
×
Fig. 7B
Measured waveform Noise
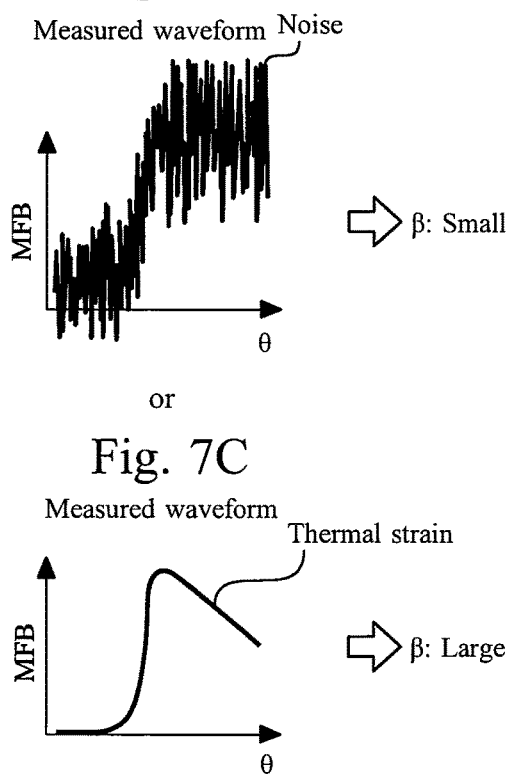
⇨ β: Small
or
Fig. 7C
Measured waveform
Thermal strain
⇨ β: Large After first LPF Before first LPF After first LPF Before first LPF After first LPF Example 1
After second LPF Noise unchanged Example 2
After second LPF Noise decrease

CONTROL APPARATUS FOR INTERNAL COMBUSTION ENGINE

CROSS-REFERENCE TO RELATED APPLICATION

The present application claims priority to Japanese Patent Application No. 2015-148803 filed on Jul. 28, 2015, which is incorporated herein by reference in its entirety.

BACKGROUND

Technical Field

Embodiments of the present disclosure relate to a control apparatus for an internal combustion engine, and more particularly to a control apparatus for an internal combustion engine that is suitable as an apparatus for controlling an internal combustion engine that includes an in-cylinder pressure sensor.

Background Art

In Japanese Patent Laid-Open No. 2008-069713, a combustion control apparatus for an internal combustion engine that includes an in-cylinder pressure sensor is disclosed. In the combustion control apparatus, data of mass fraction burned that is synchronized with a crank angle is calculated using an in-cylinder pressure sensor and a crank angle sensor, and an actual combustion start point and a combustion center are calculated based on the data. In addition, if a difference obtained by subtracting the actual combustion start point from the combustion center exceeds an upper limit, the combustion control apparatus determines that combustion has deteriorated, and implements a countermeasure for improving combustion, such as increasing the fuel injection amount. Note that, in Japanese Patent Laid-Open No. 2008-069713, as one example, an appropriate value in a period in which mass fraction burned is from 10 to 30 percent is used as the aforementioned actual combustion start point that is a crank angle at which combustion is actually started in a cylinder, and, for example, an appropriate value in a period in which mass fraction burned is from 40 to 60 percent is used as the combustion center.

Following is a list of patent documents which may be related to the present disclosure.
[Patent Document 1]
  Japanese Patent Laid-Open No. 2008-069713
[Patent Document 2]
  Japanese Patent Laid-Open No. 2014-025380
[Patent Document 3]
  Japanese Patent Laid-Open No. 2006-169996
[Patent Document 4]
  Japanese Patent Laid-Open No. 2012-077729
[Patent Document 5]
  Japanese Patent Laid-Open No. 2004-353531

Technical Problem

Noise may be superimposed on an output signal of an in-cylinder pressure sensor due to various factors. Where engine control is performed based on a crank angle at which mass fraction burned (MFB) reaches a specified mass fraction burned (hereunder, the crank angle is referred to as a "specified fraction combustion point") as disclosed in Japanese Patent Laid-Open No. 2008-069713, the specified fraction combustion point is calculated based on measured data of MFB. If noise is superimposed on an output signal of the in-cylinder pressure sensor, noise is also superimposed on the measured data of MFB that is based on measured data of the in-cylinder pressure. Consequently, an error that is caused by noise may arise with respect to a specified fraction combustion point that is utilized for engine control. If engine control based on a specified fraction combustion point is performed without giving any particular consideration to this kind of noise, there is a possibility that the accuracy of the engine control will deteriorate. Therefore, where engine control based on a specified fraction combustion point is performed, it is necessary to adopt a configuration that can appropriately detect that noise is superimposed on measured data of MFB, and to also ensure that an appropriate countermeasure is implemented when noise is detected.

On the other hand, an in-cylinder pressure detected by the in-cylinder pressure sensor may include an error due to thermal strain of a sensor tip part (thermal strain error). The measured data of MFB is also affected by the influence of the influence of the thermal strain. Because of this, if discrimination between the influence of noise on the measured data of MFB and the influence of thermal strain cannot be properly made, it is difficult to accurately grasp a change in the measured data of MFB due to the influence of noise. As a result, taking appropriately measures against noise may become difficult.

SUMMARY

Embodiments of the present disclosure address the above-described problem and have an object to provide a control apparatus for an internal combustion engine that can accurately determine that measured data of MFB is affected by the influence of the influence of noise and can perform, using results of the determination, engine control based on a specified fraction combustion point with appropriate measures against the noise.

A control apparatus for an internal combustion engine according to the present disclosure includes: an in-cylinder pressure sensor configured to detect an in-cylinder pressure; a crank angle sensor configured to detect a crank angle; and a controller. The controller is programmed to: perform, with respect to an output signal of the in-cylinder pressure sensor, a first low-pass filtering that attenuates frequency components that is higher than a first cut-off frequency; calculate first measured data of mass fraction burned that is synchronized with crank angle, based on an output signal of the in-cylinder pressure sensor after performing the first low-pass filtering and a crank angle detected by the crank angle sensor; calculate second measured data of mass fraction burned that is synchronized with crank angle, based on an output signal of the in-cylinder pressure sensor before performing the first low-pass filtering and a crank angle detected by the crank angle sensor; calculate, based on the first measured data or the second measured data, a measured value of a specified fraction combustion point that is a crank angle at which mass fraction burned reaches a specified fraction, and execute engine control that controls an actuator of the internal combustion engine based on the measured value of the specified fraction combustion point; calculate a first correlation index value that indicates a degree of correlation between the first measured data and reference data of mass fraction burned or calculate a second correlation index value that indicates a degree of correlation between the second measured data and the reference data, the reference data of mass fraction burned being based on an operating condition of the internal combustion engine; and determine whether or not a first correlation degree that indicates a degree of correlation between the first measured data and the second measured data is lower than a first degree. The controller is programmed, when a determination that the first correlation index value or the second correlation index value is less than a first determination value and the first correlation degree is lower than the first degree is made, to prohibit reflection, in the engine control, of the measured value of the specified fraction combustion point in a combustion cycle in which the first and second measured data used for the determination are calculated, or to lower a degree of the reflection in comparison to that when the first correlation index value or the second correlation index value is greater than or equal to the first determination value.

The controller may be programmed to raise an alarm for malfunction concerning the in-cylinder pressure sensor when the determination that the first correlation index value or the second correlation index value is less than the first determination value and the first correlation degree is lower than the first degree is made.

The controller may be programmed to: perform, with respect to an output signal of the in-cylinder pressure sensor, a second low-pass filtering that attenuates frequency components that is higher than a second cut-off frequency that is lower than the first cut-off frequency; calculate third measured data of mass fraction burned that is synchronized with crank angle, based on an output signal of the in-cylinder pressure sensor after performing the second low-pass filtering and a crank angle detected by the crank angle sensor; and determine whether or not a second correlation degree that indicates a degree of correlation between the first measured data and the third measured data is lower than a second degree. The engine control may control the actuator based on the measured value of the specified fraction combustion point that is calculated based on the third measured data instead of the first measured data or the second measured data. The controller may be programmed, when a determination that the first correlation index value or the second correlation index value is less than the first determination value and the first correlation degree is lower than the first degree and the second correlation degree is lower than the second degree is made, to prohibit reflection, in a predetermined detection processing, of a component that is of an output signal of the in-cylinder pressure sensor in a combustion cycle in which the first, second and third measured data used for the determination are calculated and that is of the output signal of the in-cylinder pressure sensor in a frequency band from the second cut-off frequency to the first cut-off frequency, or to lower a degree of the reflection in comparison to that when the first correlation index value or the second correlation index value is greater than or equal to the first determination value.

The controller may be programmed, when the determination that the first correlation index value or the second correlation index value is less than the first determination value and the first correlation degree is lower than the first degree and the second correlation degree is lower than the second degree is made, to permit reflection, in the engine control, of the measured value of the specified fraction combustion point in a combustion cycle in which the first, second and third measured data used for the determination are calculated, without lowering a degree of the reflection in comparison to that when the first correlation index value or the second correlation index value is greater than or equal to the first determination value.

The controller may be programmed, when a determination that the first correlation index value or the second correlation index value is less than a second determination value that is smaller than the first determination value and the first correlation degree is greater than or equal to the first degree is made, to prohibit reflection, in the engine control, of the measured value of the specified fraction combustion point in a combustion cycle in which the first and second measured data used for the determination are calculated, or to lower a degree of the reflection in comparison to that when the first correlation index value or the second correlation index value is greater than or equal to the first determination value.

The controller may be programmed to raise an alarm for malfunction concerning the in-cylinder pressure sensor when the first correlation index value or the second correlation index value is less than a second determination value that is smaller than the first determination value and the first correlation degree is greater than or equal to the first degree is made.

The first correlation index value or the second correlation index value that indicates the degree of correlation between measured data and reference data of mass fraction burned (MFB) becomes small when the measured data of MFB is affected by the influence of the influence of any of noise and thermal strain. On the other hand, the first correlation degree that is the degree of correlation between measured data of MFB after performing the first low-pass filtering and measured data of MFB before performing the first low-pass filtering becomes smaller at a time of being affected by the influence of the influence of noise than at a time of being affected by the influence of the influence of thermal strain. Therefore, according to embodiments of the present disclosure, by utilizing not only the first correlation index value or the second correlation index value but also the first correlation degree, it can be determined accurately that measured data of MFB is affected by the influence of the influence of noise. Further, it is possible to suppress, utilizing results of the determination, the occurrence of a situation in which an error in a specified fraction combustion point that is caused by noise is reflected as it is in engine control. Consequently, engine control based on a specified fraction combustion point can be performed in association with appropriate measures against the noise.

BRIEF DESCRIPTION OF THE DRAWINGS

FIG. 6A to FIG. 6C show a reference waveform, a measured waveform with an influence of noise and a waveform with an influence of thermal strain, respectively, after performing a first LPF;

FIG. 7A to FIG. 7C show a reference waveform, a measured waveform with an influence of noise and a waveform with an influence of thermal strain, respectively, before performing the first LPF;

DETAILED DESCRIPTION

First Embodiment

Firstly, a first embodiment of the present disclosure will be described with reference to FIG. 1 to FIG. 10C.

[System Configuration of First Embodiment]

Figure 1:
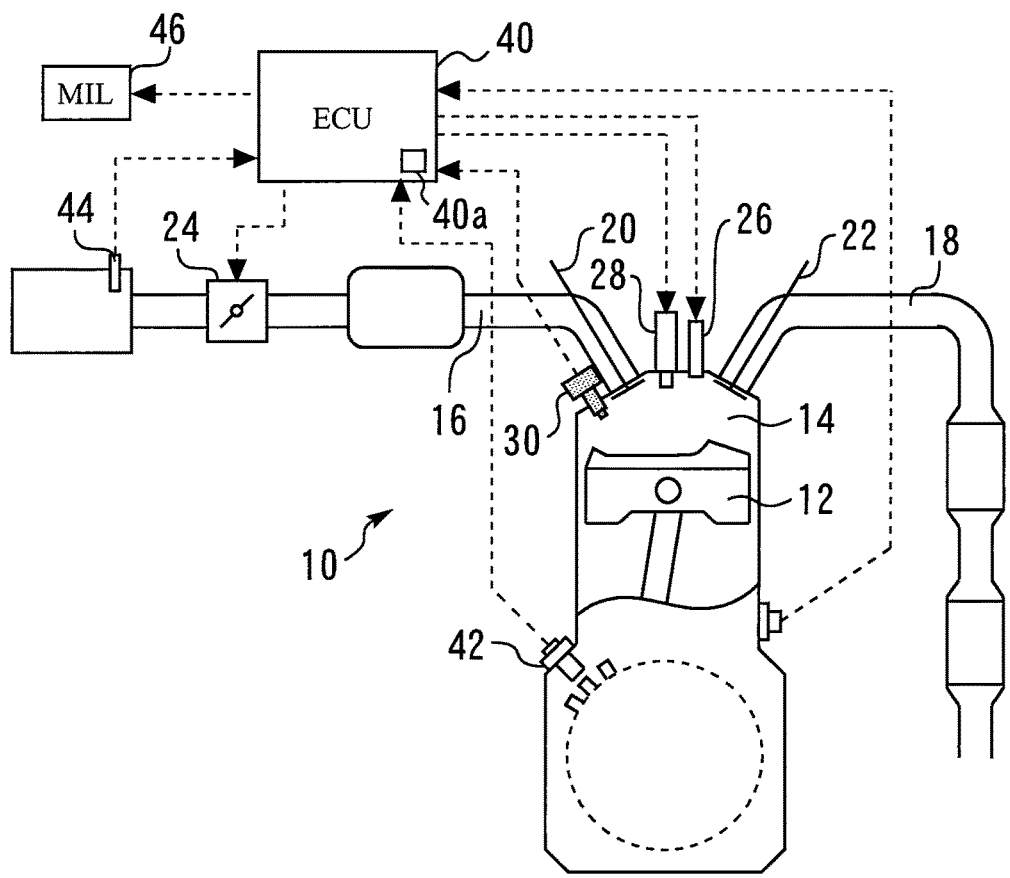
FIG. 1 is a view for describing a system configuration according to a first embodiment of the present disclosure.

FIG. 1 is a view for describing a system configuration according to a first embodiment of the present disclosure. The system shown in FIG. 1 includes a spark-ignition type internal combustion engine 10. A piston 12 is provided in each cylinder of the internal combustion engine 10. A combustion chamber 14 is formed on the top side of the piston 12 inside the respective cylinders. An intake passage 16 and an exhaust passage 18 communicate with the combustion chamber 14.

An intake valve 20 is provided in an intake port of the intake passage 16. The intake valve 20 opens and closes the intake port. An exhaust valve 22 is provided in an exhaust port of the exhaust passage 18. The exhaust valve 22 opens and closes the exhaust port. An electronically controlled throttle valve 24 is provided in the intake passage 16. Each cylinder of the internal combustion engine 10 is provided with a fuel injection valve 26 for injecting fuel directly into the combustion chamber 14 (into the cylinder), and an ignition device (only a spark plug is illustrated in the drawings) 28 for igniting an air-fuel mixture. An in-cylinder pressure sensor 30 for detecting an in-cylinder pressure is also mounted in each cylinder.

The system of the present embodiment also includes a control apparatus that controls the internal combustion engine 10. The control apparatus includes an electronic control unit (ECU) 40, drive circuits (not shown in the drawings) for driving various actuators and various sensors that are described below and the like, as a control apparatus that controls the internal combustion engine 10. The ECU 40 includes an input/output interface, a memory, and a central processing unit (CPU). The input/output interface is configured to receive sensor signals from various sensors installed in the internal combustion engine 10 or the vehicle in which the internal combustion engine 10 is mounted, and to also output actuating signals to various actuators for controlling the internal combustion engine 10. Various control programs and maps for controlling the internal combustion engine 10 are stored in the memory. The CPU reads out a control program or the like from the memory and executes the control program, and generates actuating signals for various actuators based on the received sensor signals.

The sensors from which the ECU 40 receives signals include, in addition to the aforementioned in-cylinder pressure sensor 30, various sensors for acquiring the engine operating state such as a crank angle sensor 42 that is arranged in the vicinity of a crank shaft (not illustrated in the drawings), and an air flow sensor 44 that is arranged in the vicinity of an inlet of the intake passage 16.

The actuators to which the ECU 40 outputs actuating signals include various actuators for controlling operation of the engine such as the above described throttle valve 24, fuel injection valve 26 and ignition device 28. Moreover, a malfunction indicator lamp (MIL) 46 for notifying the driver of the occurrence of malfunction about the in-cylinder pressure sensor 30 is connected to the ECU 40. The ECU 40 also has a function that synchronizes an output signal of the in-cylinder pressure sensor 30 with a crank angle, and subjects the synchronized signal to AD conversion and acquires the resulting signal. It is thereby possible to detect an in-cylinder pressure at an arbitrary crank angle timing in a range allowed by the AD conversion resolution. In addition, the ECU 40 stores a map in which the relation between a crank angle and an in-cylinder volume is defined, and can refer to the map to calculate an in-cylinder volume that corresponds to a crank angle.

Moreover, the ECU 40 includes a low-pass filter section (LPF section) 40a that utilizes a digital filtering technique. The LPF section 40a performs a first low-pass filtering (hereunder, referred to as a "first LPF") with respect to an output signal of the in-cylinder pressure sensor 30. The first LPF attenuates frequency components that are higher than a first cut-off frequency. Furthermore, the ECU 40 is configured to individually receive an output signal of the in-cylinder pressure sensor 30 before performing the first LPF and an output signal of the in-cylinder pressure sensor 30 after performing the first LPF. Note that, the configuration for allowing the ECU 40 to individually receive the output signals before and after performing the first LPF is not limited to the one that is realized by using the LPF section 40a that utilized a digital filtering technique. That is, the configuration may be realized by using an LPF section that utilizes an analog filtering technique and including a signal path with which an output signal of the in-cylinder pressure sensor 30 is input to the ECU 40 after passing through the LPF section and a signal path with which the output signal is input to the ECU 40 without passing through the LPF section.

[Engine Control in First Embodiment]
(Calculation of Measured Data of MFB Utilizing in-Cylinder Pressure Sensor)

Figure 2:
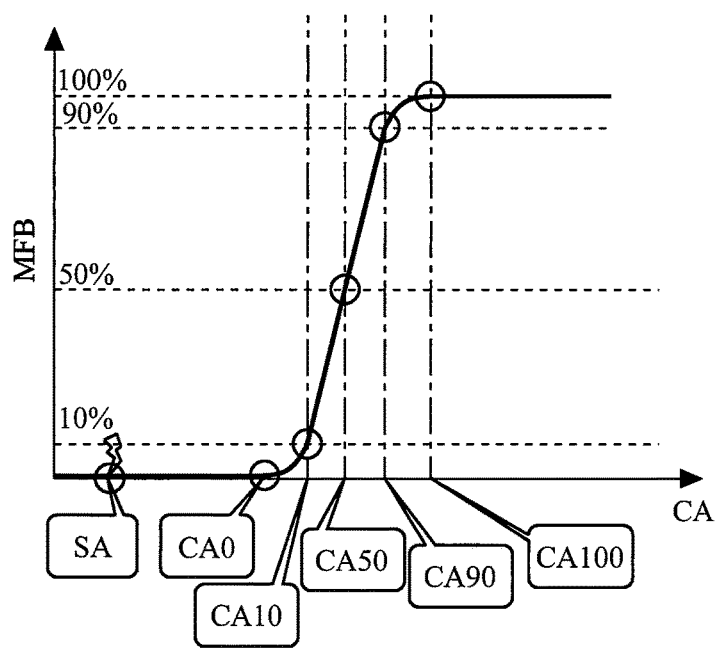
FIG. 2 is a view that represents a waveform of mass fraction burned (MFB) and a spark timing (SA)

FIG. 2 is a view that represents a waveform of mass fraction burned (MFB) and a spark timing (SA). According to the system of the present embodiment that includes the in-cylinder pressure sensor 30 and the crank angle sensor 42, in each cycle of the internal combustion engine 10, measured data of an in-cylinder pressure P can be acquired in synchrony with a crank angle (more specifically, a set of in-cylinder pressures P that are calculated as values for the respective predetermined crank angles). A heat release amount Q inside a cylinder at an arbitrary crank angle θ can be calculated according to the following equations (1) and (2) using the measured data of the in-cylinder pressure P and the first law of thermodynamics. Furthermore, a mass fraction burned (hereunder, referred to as "MFB") at an arbitrary crank angle θ can be calculated in accordance with the following equation (3) using the measured data of the heat release amount Q inside a cylinder (more specifically, a set of heat release amounts Q calculated as values for the respective predetermined crank angles). Further, measured data of MFB (measured MFB set) that is synchronized with the crank angle can be calculated by executing processing to calculate the MFB at each predetermined crank angle. The measured data of MFB is calculated in a combustion period and in a predetermined crank angle period before and after the combustion period (here, as one example, the crank angle period is from a closing timing IVC of the intake valve 20 to an opening timing EVO of the exhaust valve 22).

$$dQ/d\theta = \frac{1}{\kappa - 1} \times \left( V \times \frac{dP}{d\theta} + P \times \kappa \times \frac{dV}{d\theta} \right) \quad (1)$$

$$Q = \Sigma \frac{dQ}{d\theta} \quad (2)$$

$$MFB = \frac{Q(\theta) - Q(\theta_{min})}{Q(\theta_{max}) - Q(\theta_{min})} \quad (3)$$

Where, in the above equation (1), V represents an in-cylinder volume and κ represents a ratio of specific heat of in-cylinder gas. Further, in the above equation (3), $\theta_{min}$ represents a combustion start point and $\theta_{max}$ represents a combustion end point.

According to the measured data of MFB that is calculated by the above method, a crank angle at which MFB reaches a specified fraction X (%) (hereunder, referred to as "specified fraction combustion point", and indicated by attaching "CAX") can be acquired. More specifically, when acquiring the specified fraction combustion point CAX, although there is a possibility that a value of the specified fraction X is successfully included in the measured data of MFB, where the value is not included, the specified fraction combustion point CAX can be calculated by interpolation based on measured data located on both sides of the specified fraction X. Hereunder, in the present description, a value of CAX that is acquired utilizing measured data of MFB is referred to as a "measured CAX". A typical specified fraction combustion point CAX will now be described with reference to FIG. 2. Combustion in a cylinder starts with an ignition delay after igniting an air-fuel mixture is performed at the spark timing (SA). A start point of the combustion ($\theta_{min}$ in the above described equation (3)), that is, a crank angle at which MFB starts to rise is referred to as "CA0". A crank angle period (CA0-CA10) from CA0 until a crank angle CA10 at which MFB reaches 10% corresponds to an initial combustion period, and a crank angle period (CA10-CA90) from CA10 until a crank angle CA90 at which MFB reaches 90% corresponds to a main combustion period. Further, according to the present embodiment, a crank angle CA50 at which MFB reaches 50% is used as a combustion center. A crank angle CA100 at which MFB reaches 100% corresponds to a combustion end point ($\theta_{max}$ in the above described equation (3)) at which the heat release amount Q reaches a maximum value. The combustion period is defined as a crank angle period from CA0 to CA100.

(Engine Control Utilizing CAX)

Figure 3:
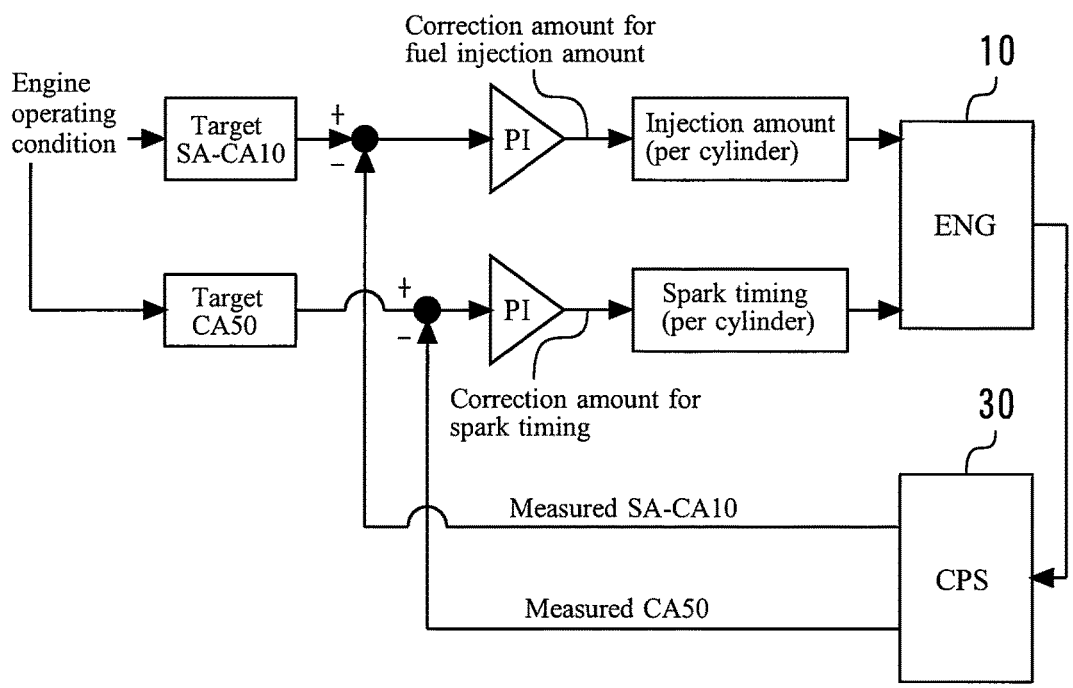
FIG. 3 is a block diagram for describing an outline of two types of feedback control utilizing CA10 and CA50 that an ECU executes.

FIG. 3 is a block diagram for describing an outline of two types of feedback control utilizing CA10 and CA50 that the ECU 40 executes. The engine control that the ECU 40 performs includes control utilizing a specified fraction combustion point CAX. Here, as examples of engine control utilizing a specified fraction combustion point CAX, two types of feedback control that utilize CA10 and CA50, respectively, will be described. According to the present embodiment, these controls are executed during lean-burn operation that is performed at a larger (leaner) air-fuel ratio than the stoichiometric air-fuel ratio. Note that, in the present embodiment, CA10 and CA50 used for the aforementioned controls are calculated using the measured data of MFB after performing the first LPF. However, a configuration may be adopted such that CA10 and CA50 are calculated using the measured data of MFB before performing the first LPF.

1. Feedback Control of Fuel Injection Amount Utilizing SA-CA10

In this feedback control, CA10 that is the 10% combustion point is not taken as a direct target value, but is instead utilized as follows. That is, in the present description, a crank angle period from the spark timing SA to CA10 is referred to as "SA-CA10". More specifically, SA-CA10 that is a difference obtained by subtracting the spark timing SA from the measured CA10 is referred to as a "measured SA-CA10". Note that, according to the present embodiment, a final target spark timing (command value of spark timing in the next cycle) after adjustment by feedback control of the spark timing utilizing CA50 as described later is used as the spark timing SA that is used for calculating the measured SA-CA10.

SA-CA10 is a parameter that represents an ignition delay, and there is a correlation between SA-CA10 and the air-fuel ratio. More specifically, in a lean air-fuel ratio range, there is a relation that SA-CA10 increases as the air-fuel ratio becomes leaner. Therefore, a target SA-CA10 that corresponds to a desired target air-fuel ratio can be determined by utilizing a predetermined relation between the air-fuel ratio and SA-CA10. In addition, according to the present embodiment a configuration is adopted so that, during lean-burn operation, feedback control is executed that adjusts a fuel injection amount so that the measured SA-CA10 comes close to the target SA-CA10 (hereunder, referred to simply as "SA-CA10 feedback control").

As shown in FIG. 3, in the SA-CA10 feedback control, the target SA-CA10 is set in accordance with the engine operating condition (more specifically, the target air-fuel ratio, the engine speed and the intake air flow rate). The measured SA-CA10 is calculated for each cycle in the respective cylinders. Further, in the SA-CA10 feedback control, as one example, PI control is used to adjust the fuel injection amount so that a difference between the target SA-CA10 and the measured SA-CA10 is eliminated. In the PI control, using a difference between the target SA-CA10 and the measured SA-CA10 as well as a predetermined PI gain (proportional gain and integral gain), a correction amount for the fuel injection amount is calculated in accordance with the size of the difference and the size of an integrated value thereof. A correction amount that is calculated for each cylinder is reflected in the basic fuel injection amount of the cylinder that is the object of adjustment. As a result, the fuel injection amount to be supplied in the next cycle at the cylinder is adjusted (corrected) by the SA-CA10 feedback control.

According to the SA-CA10 feedback control, in a cylinder in which a measured SA-CA10 that is less than the target SA-CA10 is obtained, correction is executed that decreases the fuel injection amount to be used in the next cycle to thereby make the air-fuel ratio leaner and increase the measured SA-CA10. Conversely, in a cylinder in which a measured SA-CA10 that is greater than the target SA-CA10 is obtained, correction is executed that increases the fuel injection amount to be used in the next cycle to thereby make the air-fuel ratio richer and decrease the measured SA-CA10.

According to the SA-CA10 feedback control, by utilizing SA-CA10 that is a parameter that has a high correlation with the air-fuel ratio, the air-fuel ratio during lean-burn operation can be controlled to a target value (target air-fuel ratio). Consequently, by setting the target SA-CA10 to a value corresponding to an air-fuel ratio in the vicinity of a lean combustion limit, the air-fuel ratio can be controlled in the vicinity of the lean limit. By this means, low fuel consumption and low NOx emissions can be realized.

2. Feedback Control of Spark Timing Utilizing CA50

The optimal spark timing (so-called "MBT (Minimum spark advance for the Best Torque) spark timing") changes according to the air-fuel ratio. Therefore, if the air-fuel ratio changes as a result of the SA-CA10 feedback control, the MBT spark timing will also change. On the other hand, CA50 at which the MBT spark timing is obtained substantially does not change with respect to the air-fuel ratio in the lean air-fuel ratio range. Therefore it can be said that, by adopting, as a target CA50, CA50 when the MBT spark timing is obtained, and correcting the spark timing so that a difference between the measured CA50 and the target CA50 is eliminated, the spark timing at a time of lean-burn operation can be adjusted to the MBT spark timing without being affected by the influence of a change in the air-fuel ratio. Therefore, according to the present embodiment a configuration is adopted that, during lean-burn operation, together with the SA-CA10 feedback control, also executes feedback control that adjusts the spark timing so that the measured CA50 comes close to the target CA50 (hereunder, referred to simply as "CA50 feedback control").

As shown in FIG. 3, in the CA50 feedback control, the target CA50 for making the spark timing the MBT spark timing is set to a value that is in accordance with the engine operating condition (more specifically, the target air-fuel ratio, the engine speed and the intake air flow rate). Note that, the term "CA50 feedback control" used herein is not necessarily limited to control that controls the spark timing so as to obtain the MBT spark timing. That is, the CA50 feedback control can also be used in an example where a spark timing other than the MBT spark timing is adopted as a target value, such as at so-called a time of retarded combustion. In such an example, for example, in addition to the above described engine operating condition, the target CA50 can be set so as to change in accordance with a target ignition efficiency (an index value indicating the degree of divergence of the target value from the MBT spark timing).

The measured CA50 is calculated for each cycle in the respective cylinders. Further, in the CA50 feedback control, as one example, PI control is used to correct the spark timing from the basic spark timing so that a difference between the target CA50 and the measured CA50 is eliminated. The basic spark timing is previously stored in the ECU 40 as a value that is in accordance with the engine operating condition (mainly, the intake air flow rate and the engine speed). In the PI control, using a difference between the target CA50 and the measured CA50 as well as a predetermined PI gain (proportional gain and integral gain), a correction amount of the spark timing is calculated that is in accordance with the size of the difference as well as the size of an integrated value of the difference. A correction amount that is calculated for each cylinder is reflected in the basic spark timing for the target cylinder. By this means, the spark timing (target spark timing) to be used in the next cycle at the cylinder is adjusted (corrected) by the CA50 feedback control.

[Method for Malfunction Detection, and Countermeasure at Time of Malfunction Detection According to First Embodiment]

(Influence that Noise Superimposed on in-Cylinder Pressure Data Imparts to Engine Control)

Noise may be superimposed on an output signal of the in-cylinder pressure sensor 30 due to a variety of factors. If noise is superimposed on an output signal of the in-cylinder pressure sensor 30, noise is also superimposed on measured data of the heat release amount Q calculated based on the in-cylinder pressure, and further on measured data of MFB. As a result of this, an error due to noise may be included in CA10 and CA50 that are used for the SA-CA10 feedback control and the CA50 feedback control that are engine control according to the present embodiment. If engine control, such as the SA-CA10 feedback control and the CA50 feedback control is performed without giving any particular consideration to this kind of noise, there is a possibility that the accuracy of the engine control will deteriorate.

(Noise Detection Utilizing Degree of Correlation Between Measured Data and Reference Data of MFB)

When various usage environments of the internal combustion engine 10 are supposed, it is difficult to ascertain in advance when and in what form noise that has an influence on engine control will be superimposed on an output signal of the in-cylinder pressure sensor 30. However, where the above described SA-CA10 feedback control and CA50 feedback control based on the output of the in-cylinder pressure sensor 30 are performed, it is required that it is possible to appropriately detect that measured data of MFB is affected by the influence of noise, and that an appropriate countermeasure is taken when noise is detected.

Figure 4:
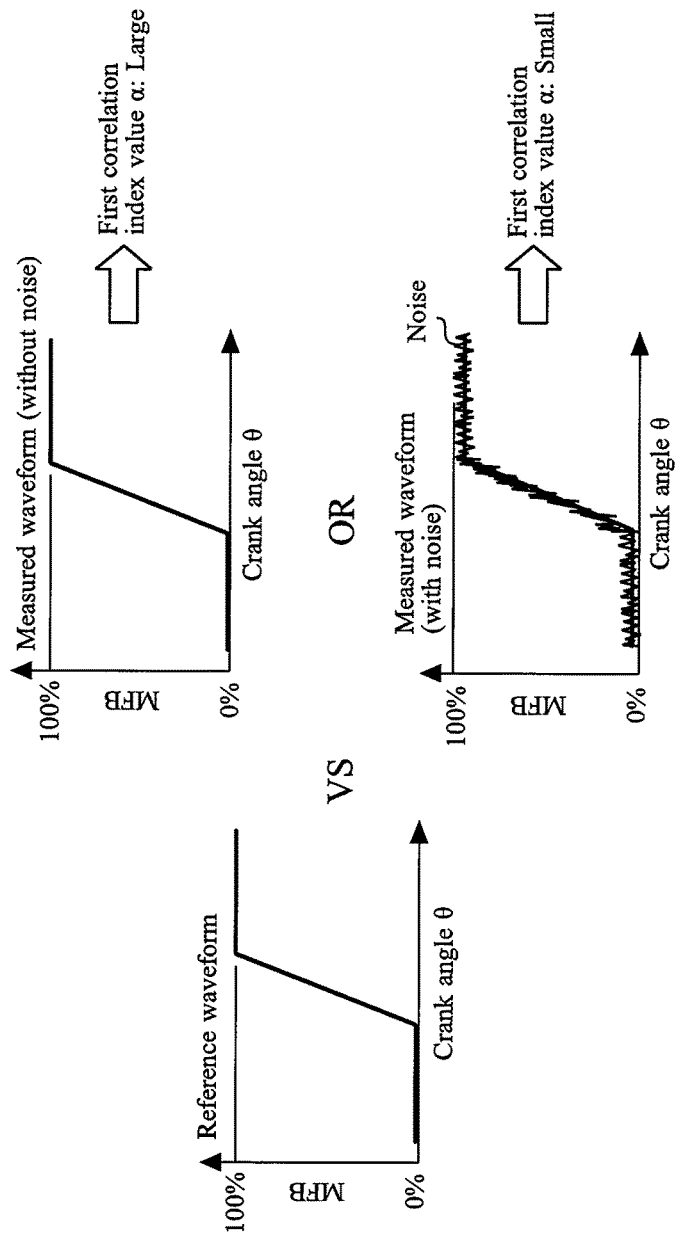
FIG. 4 is a view for describing a method for performing noise detection by determining the degree of correlation between reference data and measured data of MFB.

FIG. 4 is a view for describing a method for performing noise detection by determining the degree of correlation between reference data and measured data of MFB. A reference waveform shown in FIG. 4 is a waveform of reference data of MFB that is defined based on an engine operating condition. Measured waveforms shown in the same drawing are waveforms of measured data of MFB. More specifically, the measured waveform (without noise) schematically shows an example where noise is not superimposed, while the measured waveform (with noise) schematically shows an example where noise is superimposed wholly during a combustion period (CA0 to CA100) and crank angle periods before and after the combustion period (CA0 to CA100).

If measured data of MFB is affected by the influence of noise, the measured data differs from the reference data of MFB at the same operating condition, which is not affected by the influence of this kind of noise. Accordingly, in the present embodiment, in order to detect that measured data of MFB is affected by the influence of noise, the magnitude of a "first correlation index value $\alpha$" that indicates the degree of correlation between reference data and measured data of MFB is evaluated. In addition, according to the present embodiment, a cross-correlation function is used as one example of a method for calculating the first correlation index value α. Calculation of a cross-correlation coefficient R using a cross-correlation function is performed using the following equation (4).

$$R = \Sigma f_{a \sim b}(\theta) g_{a \sim b}(\tau_\theta - \theta) \qquad (4)$$

Where, in the above equation (4), θ represents the crank angle. Further, $\tau_\theta$ is a variable that represents a relative deviation in a crank angle axis direction with respect to two waveforms that are objects for evaluation of the degree of correlation (in the present embodiment, waveforms for reference data and measured data of MFB). A function $f_{a \sim b}(\theta)$ corresponds to reference data of MFB that is a set of discrete values that exists for each predetermined crank angle. A function $g_{a \sim b}(\tau_\theta - \theta)$ corresponds to measured data of MFB that, likewise, is a set of discrete values. More specifically, (a~b) indicates a period on the crank angle axis in which these functions $f_{a \sim b}(\theta)$ and $g_{a \sim b}(\tau_\theta - \theta)$ are respectively defined. The period (a~b) corresponds to a crank angle period (hereunder, referred to as an "evaluation period T") in which reference data and measured data exist that are objects for calculation of the cross-correlation coefficient R (in other words, objects for evaluation of the degree of correlation) in the reference data and measured data of MFB. As one example, a period from a spark timing (SA) to an opening timing of the exhaust valve 22 (EVO) is used as the evaluation period T. However, the whole or a part of a crank angle period from a closing timing of the intake valve 20 (IVO) to an opening timing of the exhaust valve 22 (EVO) may be used as the evaluation period T. Further, the evaluation period T may be a period identified utilizing any one of reference data and measured data. Note that, in an example where measured values of the specified fraction combustion points CAX (in the present embodiment, CA10 and CA50) that are used in the engine control are not included in the measured data of MFB that is calculated based on measured data of the in-cylinder pressure, a configuration may be adopted in which such a measured value is acquired by interpolation based on adjacent measured data, and a value on the reference data side that serves as a counterpart in a pair with the measured value is acquired, and the pair of values are included in the objects for evaluating the degree of correlation.

Performance of a convolution operation using equation (4) is accompanied by an operation that, by varying the variable $\tau_\theta$ within a predetermined range, consecutively calculates the cross-correlation coefficient R while causing the entire waveform of the measured data of MFB within the evaluation period T to move little by little in the crank angle direction (horizontal axis direction in FIG. 4) while keeping the waveform of the reference data fixed. A maximum value $R_{max}$ of the cross-correlation coefficient R in the course of this operation corresponds to the cross-correlation coefficient R when two waveforms are closest to each other overall, and can be expressed as shown in the following equation (5). In addition, the first correlation index value α used in the present embodiment is not the maximum value $R_{max}$ itself, but rather is a value obtained by performing predetermined normalization processing on the cross-correlation coefficient R. The term "normalization processing" used here refers to processing that is defined so that $R_{max}$ shows a value of 1 when the two waveforms (reference data waveform and measured data waveform) are completely matching, and since this processing itself is known, a detailed description thereof is omitted here.

$$R_{max} = \max(R) = \max(\Sigma f_{a \sim b}(\theta) g_{a \sim b}(\tau_\theta - \theta)) \qquad (5)$$

The first correlation index value α calculated by the aforementioned calculation processing becomes 1 (maximum) in an example where the two waveforms completely match, and progressively approaches zero as the degree of correlation between the two waveforms decreases. Note that, in an example where the first correlation index value α exhibits a negative value, there is a negative correlation between the two waveforms, and the first correlation index value α exhibits a value of −1 in an example where the two waveforms are completely inverted. Accordingly, the degree of correlation between reference data and measured data of MFB can be ascertained on the basis of the first correlation index value α that is obtained as described above.

In the example illustrated in FIG. 4, the first correlation index value α becomes a large value (a value close to 1) in a measured waveform (without noise). On the other hand, in a measured waveform (with noise) on which noise is superimposed, the first correlation index value α becomes a small value relative to the value in the measured waveform (without noise). Further, the first correlation index value α decreases as the magnitude of noise that is superimposed increases.

Note that, although according to the present embodiment a configuration is adopted in which, as described above, the maximum value of a value obtained by normalizing the cross-correlation coefficient R is used as the first correlation index value α, a "correlation index value" according to the present disclosure may also be the maximum value $R_{max}$ itself of the cross-correlation coefficient R that is not accompanied by predetermined normalization processing. This also applies with respect to second to fourth correlation index values β, γ and δ that are described later. However, the correlation index value (that is, the maximum value $R_{max}$) in an example that is not accompanied by normalization processing does not simply increase as the degree of correlation increases, but rather the relation described hereunder exists between the size of the maximum value $R_{max}$ and increases/decreases in the degree of correlation. That is, the degree of correlation increases as the maximum value $R_{max}$ increases, and the degree of correlation becomes highest (that is, the two waveforms completely match) when the maximum value $R_{max}$ equals a certain value Y. Further, when the maximum value $R_{max}$ increases to a value greater than the value Y, the degree of correlation decreases with an increase in the maximum value $R_{max}$. Accordingly, in the example of using the maximum value $R_{max}$ as it is as the "correlation index value" without normalization processing, a determination as to whether or not the "correlation index value" is less than a "determination value" can be performed by the following processing. That is, when the maximum value $R_{max}$ deviates from within a predetermined range that is centered on the value Y, it can be determined that "the correlation index value is less than the determination value" and, conversely, when the maximum value $R_{max}$ falls within the aforementioned predetermined range, it can be determined that "the correlation index value is greater than or equal to the determination value".

(Discrimination Between Influence of Noise on Measured Data of MFB and Influence of Thermal Strain Thereon)

Figure 5A:
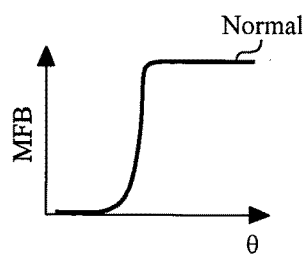
FIG. 5A to FIG. 5C are views for representing the influence of noise on measured data of MFB and the influence of thermal strain thereon.
Figure 5B:
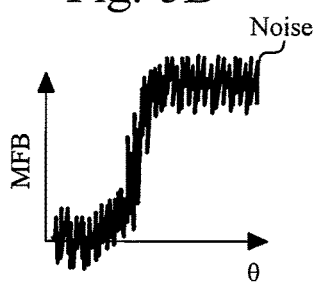
Figure 5C:
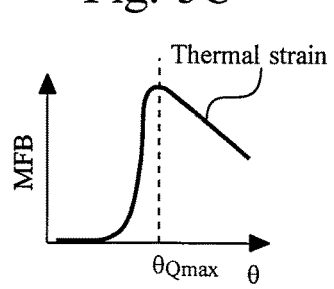

FIG. 5A to FIG. 5C are views for representing the influence of noise on measured data of MFB and the influence of thermal strain thereon. A waveform shown by attaching "Normal" in FIG. 5A represents an ideal waveform of measured data of MFB which is not affected by the influence of any of noise and thermal strain (which corresponds to a waveform of reference data).

Measured data of MFB is affected by not only the influence of noise as described above, but also the influence of thermal strain of the in-cylinder pressure sensor 30. The thermal strain mentioned here is a phenomenon in which a sensor the tip part exposed inside the cylinder deforms due to a high temperature combustion gas. If this kind of thermal strain arises, in-cylinder pressure detected by the in-cylinder pressure sensor 30 may include an error due to the thermal strain (thermal strain error).

The thermal strain error affects a heat release rate $dQ/d\theta$ calculated by the aforementioned equation (1), and, as a result, also affects measured data of heat release amount Q and measured data of MFB that are calculated by the aforementioned equations (2) and (3), respectively. More specifically, as the thermal strain error increases, measured data of MFB is largely affected by the influence of the thermal strain. A thermal strain error due to combustion at a certain combustion cycle affects the measured data of MFB during a crank angle period after the combustion period of the certain combustion cycle (that is, the measured data of MFB after a crank angle (heat release amount maximum crank angle $\theta_{Qmax}$) at which the heat release amount Q reaches the maximum heat release amount Qmax). Note that a waveform of measured data of MFB shown by attaching "Thermal strain" in FIG. 5C represents one example of a waveform which includes a thermal strain error in a manner that a value in the measured data decreases as the crank angle $\theta$ progresses. In contrast to this example, a thermal strain error may be included in a crank angle period after $\theta_{Qmax}$ in a manner that a value in the measured data increases as the crank angle $\theta$ progresses.

Because the degree of correlation between measured data and reference data of MFB decreases due to the influence of a thermal strain error, the first correlation index value $\alpha$ decreases due to not only the influence of noise as shown in FIG. 5B but also the influence of the thermal strain error. Therefore, when it is supposed that a thermal strain error arises, it is difficult to determine whether the reason why the first correlation index value $\alpha$ is small is the influence of noise or the influence of thermal strain only by simply evaluating the magnitude of the first correlation index value $\alpha$ relating to MFB data. Thus, it becomes difficult to accurately determine that the measured data of MFB is affected by the influence of noise.

It is assumed herein that the degree of decrease in the first correlation index value $\alpha$ in each of the measured waveform (noise) and the measured waveform (thermal strain) shown in FIG. 5B and FIG. 5C is the same level. As already described, in an example where measured data of MFB is affected by the influence of noise, an error is included in CA50 and CA10 that are calculated. On the other hand, in the waveform affected by the influence of thermal strain, data during the combustion period (CA0-CA100) does not show drastic changes from that of the normal waveform as seen from comparison between FIG. 5A and FIG. 5C. Thus, it is found that, even if two measured data are similar with respect to the degree of a decrease in the first correlation index value $\alpha$, the influence of thermal strain on CA50 and CA10 is lower than the influence of noise. It can therefore be said that the influence on engine control utilizing a specified fraction combustion point CAX is larger in measured waveform affected by the influence of noise than in measured waveform affected by the influence of thermal strain, even if the degree of decrease in the first correlation index value $\alpha$ is the same level. Accordingly, if the influence of noise and influence of thermal strain on measured data of MFB cannot be properly discriminated, a change in measured data of MFB due to the influence of noise becomes difficult to be accurately ascertained, and, as a result, there is a possibility that appropriately measures against noise becomes difficult to be taken.

FIG. 6A to FIG. 6C show a reference waveform, a measured waveform with an influence of noise and a waveform with an influence of thermal strain, respectively, after performing the first LPF. On the other hand, FIG. 7A to FIG. 7C show a reference waveform, a measured waveform with an influence of noise and a waveform with an influence of thermal strain, respectively, before performing the first LPF.

The above described first correlation index value $\alpha$ indicates the degree of correlation between reference data of MFB and measured data of MFB after performing the first LPF. In addition, a correlation index value that indicates the degree of correlation between measured data of MFB before performing the first LPF and the reference data is herein referred to as a "second correlation index value $\beta$".

Noise that is assumed in the present embodiment is superimposed wholly in each frequency band of an output signal of the in-cylinder pressure sensor 30. If the first LPF is performed to the output signal of the in-cylinder pressure sensor 30, noise superimposed in a frequency band that is higher than a first cut-off frequency f1 is removed. Therefore, in an example in which measured data of MFB is affected by the influence of noise, the degree of correlation between the measured data of MFB after performing the first LPF and the measured data of MFB before performing the first LPF decreases as will be understood by comparing FIG. 6B with FIG. 7B. As a result of this, the first correlation index value $\alpha$ for the measured data of MFB after performing the first LPF becomes greater than the second correlation index value $\beta$ for the measured data of MFB before performing the first LPF.

On the other hand, in an example in which measured data of MFB is affected by the influence of thermal strain, the degree of correlation between the measured data of MFB that are obtained before and after performing the first LPF does not substantially change as will be understood by comparing FIG. 6C with FIG. 7C. As a result of this, a difference between the first correlation index value $\alpha$ for the measured data of MFB after performing the first LPF and the second correlation index value $\beta$ for the measured data of MFB before performing the first LPF becomes sufficiently small in the example of being affected by the influence of thermal strain.

Based on the foregoing facts, a difference D1 ($=\alpha-\beta$) obtained by subtracting the second correlation index value $\beta$ from the first correlation index value $\alpha$ indicates a positive value, and the difference D1 becomes greater in an example in which measured data of MFB is affected by the influence of noise than in an example in which measured data is affected by the influence of thermal strain. Further, as already described, the fact itself that measured data of MFB is affected by the influence of noise or thermal strain at or beyond a certain level can be ascertained by evaluating the magnitude of the first correlation index value $\alpha$. Therefore, by properly setting in advance a determination value $D1_{th}$ (positive value) as a value for discriminating a difference D1 that is obtained in an example in which measured data is affected by the influence of noise from a difference D1 that is obtained in an example in which measured data is affected by the influence of thermal strain when the first correlation index value $\alpha$ is less than a predetermined first determination value $\alpha_{th1}$, the example of being affected by the influence of noise can be properly discriminated from the example of being affected by the influence of thermal strain based on a comparison result between the difference D1 and the determination value $D1_{th}$.

(Detection and Countermeasures for Noise)

If the SA–CA10 feedback control and the CA50 feedback control are continued without change irrespective of a fact that the two types of feedback control are being performed under a situation in which noise is superimposed on measured data of MFB, there is a possibility that high-accuracy feedback control cannot be performed. Accordingly, it is determined in the present embodiment that, when the first correlation index value $\alpha$ is less than the first correlation index value $\alpha_{th1}$ and the difference D1 between the first correlation index value $\alpha$ and the second correlation index value $\beta$ is greater than or equal to a determination value $D1_{th}$, measured data of MFB is affected by the influence of noise.

Further, when the result of the aforementioned determination is affirmative, the SA–CA10 feedback control and the CA50 feedback control are suspended. Reflection, in the SA–CA10 feedback control and the CA50 feedback control, of the measured CA10 and the measured CA50, respectively, in the combustion cycle in which the first correlation index value $\alpha$ and the second correlation index value $\beta$ that are the object of the affirmative determination are calculated is thereby prohibited. On the other hand, when the first correlation index value $\alpha$ is less than the first correlation index value $\alpha_{th1}$ and the difference D1 is less than the determination value $D1_{th}$ (that is, in an example of being affected by the influence of thermal strain), it is determined in the present embodiment that the influence of thermal strain on CA10 and CA50 is small, and suspending the SA–CA10 feedback control and the CA50 feedback control is not performed.

Moreover, it is conceivable that, when noise at or beyond a certain level is superimposed on measured data of MFB, malfunction arises at an electric circuit (not shown in the drawings) of the in-cylinder pressure sensor 30. Accordingly, it is determined in the present embodiment that, when the first correlation index value $\alpha$ for MFB is less than the first correlation index value $\alpha_{th1}$ and the difference D1 is greater than or equal to the determination value $D1_{th}$, malfunction arises at the electric circuit of the in-cylinder pressure sensor 30, and the MIL 46 is turned on. Note that, for example, poor connection of a ground wire of the in-cylinder pressure sensor 30 corresponds to malfunction of the electric circuit mentioned here.

(Specific Processing in First Embodiment)

Figure 8:
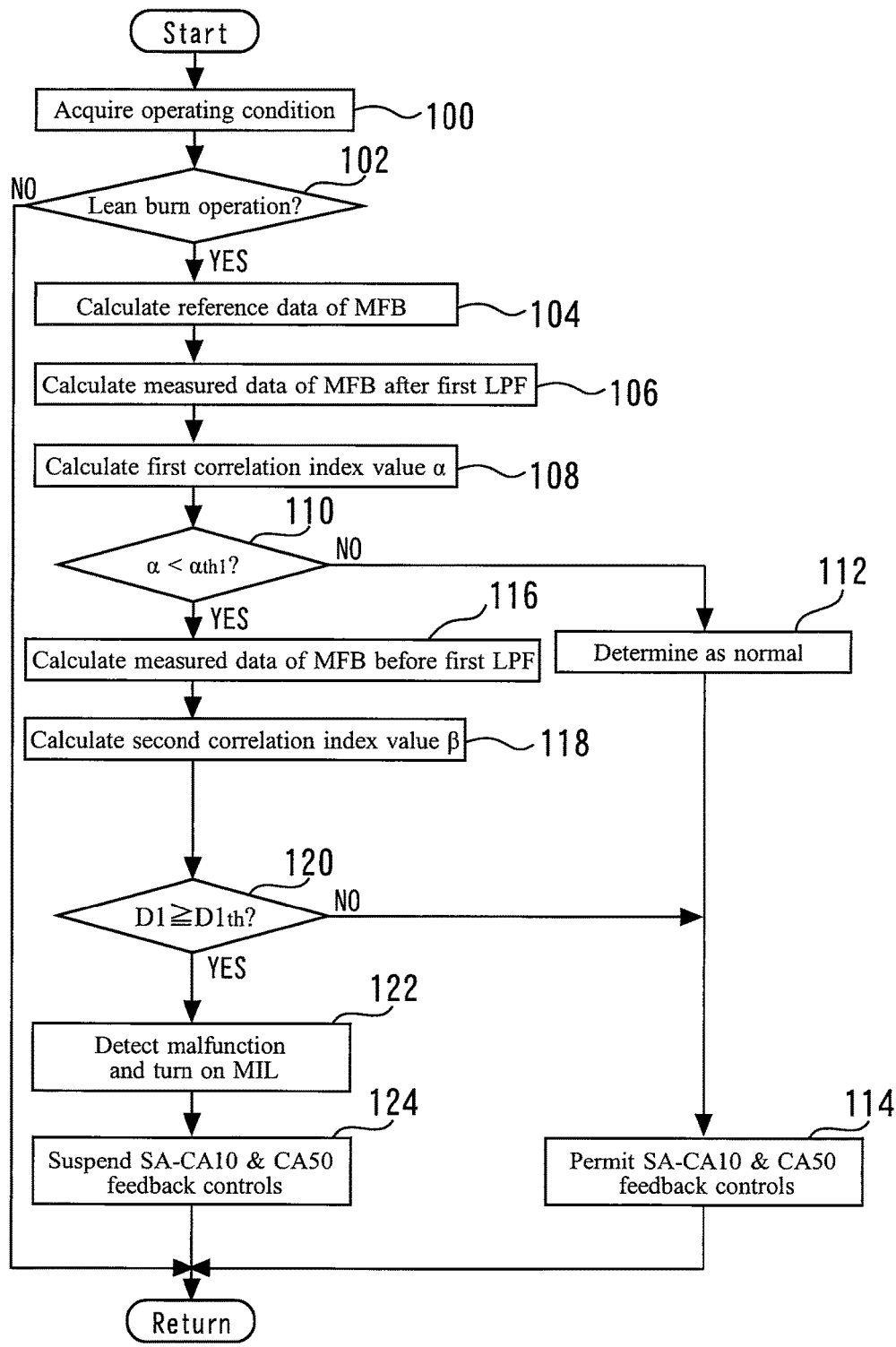
FIG. 8 is a flowchart illustrating a routine that the ECU executes in the first embodiment of the present disclosure.

FIG. 8 is a flowchart illustrating a routine that the ECU 40 executes in the first embodiment of the present disclosure. Note that the present routine is started at a timing at which the opening timing of the exhaust valve 22 has passed in each cylinder, and is repeatedly executed for each combustion cycle.

In the routine shown in FIG. 8, first, in step 100, the ECU 40 acquires the current engine operating condition. The term "engine operating condition" used here refers to mainly the engine speed, the intake air flow rate, the air-fuel ratio and the spark timing. The engine speed is calculated using the crank angle sensor 42. The intake air flow rate is calculated using the air flow sensor 44. The air-fuel ratio is a target air-fuel ratio, and can be calculated from a map that defines the target air-fuel ratio based on the engine torque and the engine speed. The target air-fuel ratio is either one of a certain lean air-fuel ratio used at a time of lean burn operation and the stoichiometric air-fuel ratio. The spark timing is a command value of the spark timing used in the current combustion cycle (that is, a target spark timing). At a time of operation using the stoichiometric air-fuel ratio, the target spark timing is determined using the intake air flow rate and engine speed as main parameters, while, at a time of lean burn operation, a value in which the CA50 feedback control has been reflected is used as the target spark timing. Note that a target engine torque calculated based on an accelerator position detected by an accelerator position sensor (not shown in the drawings) of the vehicle can, for example, be used as the engine torque.

Next, the ECU 40 proceeds to step 102 and determines whether or not the current operating region is a lean burn operating region. Specifically, it is determined whether the current operating region is a lean burn operating region or an operation region using the stoichiometric air-fuel ratio, based on the target air-fuel ratio acquired in step 100.

When the determination results of step 102 is negative, the current processing of the routine is promptly ended. When, on the other hand, the determination results of step 102 is affirmative, the ECU 40 proceeds to step 104. In step 104, based on the engine operating condition acquired in step 100, reference data of MFB is calculated for the evaluation period T. The evaluation period T is, as one example, from a spark timing (SA) to an opening timing of the exhaust valve 22 (EVO). As one example, the reference data of MFB can be calculated using a method described hereunder with reference to FIG. 9.

Figure 9:
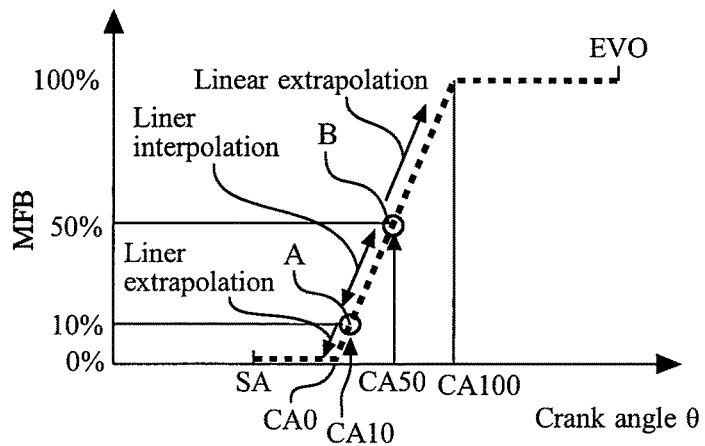
FIG. 9 is a view for describing one example of a method for creating reference data of MFB.

FIG. 9 is a view for describing one example of a method for creating reference data of MFB. FIG. 9 represents an xy-plane (hereunder, referred to as an "MFB-$\theta$ plane") that takes the crank angle $\theta$ as an x-coordinate value and the mass fraction burned MFB as a y-coordinate value.

As already described above with reference to FIG. 3, the target CA50 that is the target value for the CA50 feedback control is determined as a value that is in accordance with the engine operating condition (target air-fuel ratio, engine speed and intake air flow rate). The target SA–CA10 that is the target value of the SA–CA10 feedback control is likewise determined as a value that is in accordance with the engine operating condition. In lean burn operation in which the CA50 feedback control is executed, a command value (target spark timing) of the spark timing (SA) in each combustion cycle is determined as a value which is based on the basic spark timing according to the engine operating condition and in which the CA50 feedback control has been reflected. The value of CA10 can be calculated based on the target SA–CA10 and the target spark timing that are calculated in this manner. However, since this CA10 itself is not a direct control target value of the SA–CA10 feedback control, hereunder, the CA10 is referred to as a "specified CA10".

CA50 is a crank angle at which MFB reaches 50%, and CA10 is a crank angle at which MFB reaches 10%. Consequently, if the value of the target CA50 and the value of the specified CA10 are determined, a point A and a point B at which the target CA50 and the specified CA10 are located, respectively, on the MFB-$\theta$ plane shown in FIG. 9 are naturally determined.

In order to evaluate the degree of correlation of measured data of MFB, it is necessary for the reference data to have, without omission, data that serves as a pair for each data item of the measured data that is acquired for each predetermined crank angle. To achieve this, according to the present method, linear interpolation and linear extrapolation are performed based on the two points A and B, and reference data of MFB is thereby generated within a crank angle period from a combustion start point CA0 to a combustion end point CA100. Further, reference data for a crank angle period prior to CA0 is generated using data in which MFB is 0%, and reference data for a crank angle period after CA100 is generated using data in which MFB is 100%. Reference data of MFB in step 104 is generated in this manner. A waveform which the generated reference data traces is a waveform as illustrated by a broken line in FIG. 9. According to the present method that utilizes a direct or indirect control target value (target CA50 and specified CA10) in engine control based on a specified fraction combustion point CAX, reference data of MFB can be generated simply and accurately while grasping the characteristics of waveform of data of MFB. Note that, where the ECU 40 proceeds to present step 104 to calculate reference data in a state in which the SA-CA10 feedback control and CA50 feedback control are suspended by the processing of step 124 described later, values of the target CA50 and specified CA10 that are immediately before the suspension can be used.

Next, the ECU 40 proceeds to step 106. In step 106, measured data of MFB is calculated in accordance with the above described equation (3) based on measured data of the in-cylinder pressure after performing the first LPF out of the measured data of the in-cylinder pressure that is acquired using the in-cylinder pressure sensor 30 in the current combustion cycle.

Next, the ECU 40 proceeds to step 108. In step 108, with the reference data of MFB calculated in step 104 and the measured data after performing the first LPF calculated in step 106, the first correlation index value α is calculated using the aforementioned equation (5) by taking as an object the evaluation period T.

Next, the ECU 40 proceeds to step 110. In step 110, the ECU 40 determines whether or not the first correlation index value α calculated in step 108 is less than a predetermined first determination value $α_{th1}$. The first determination value $α_{th1}$ used in present step 110 is set in advance as a value for determining that noise, the magnitude of which is larger than or equal to that of noise which affects the SA-CA10 feedback control and the CA50 feedback control, has been superimposed.

If the determination results of step 110 is negative ($α ≥ α_{th1}$), that is, if it can be determined that the degree of correlation between the measured data of MFB of the current combustion cycle and the reference data thereof at the same operating condition is high, the ECU 40 proceeds to step 112 and determines that the measured data of MFB of the current combustion cycle is normal. Next, the ECU 40 proceeds to step 114 and permits the continuance of the SA-CA10 feedback control and the CA50 feedback control.

If, on the other hand, the determination results of step 110 is affirmative ($α < α_{th1}$), that is, if it can be determined that the degree of correlation between the measured data of MFB and the reference data thereof is low, the ECU 40 proceeds to step 116. In step 116, based on the measured data of the in-cylinder pressure before performing the first LPF out of the measured data of the in-cylinder pressure obtained using the in-cylinder pressure sensor 30 in the current combustion cycle, measured data of MFB is calculated using the aforementioned equation (3).

Next, the ECU 40 proceeds to step 118. In step 118, with the reference data of MFB calculated in step 104 and the measured data before performing the first LPF calculated in step 116, the second correlation index value β is calculated using the aforementioned equation (5) by taking as an object the evaluation period T.

Next, the ECU 40 proceeds to step 120. In step 120, the ECU 40 determines whether or not the difference D1 (=α−β) between the first correlation index value α calculated in step 108 and the second correlation index value β calculated in step 118 is greater than or equal to a predetermined determination value $D1_{th}$. As described above, the determination value $D1_{th}$ used in present step 120 is set in advance as a value for discriminating a difference D1 that is obtained in an example of being affected by the influence of noise from a difference D1 that is obtained in an example of being affected by the influence of thermal strain.

If the determination results of step 120 is negative ($D1 < D1_{th}$), that is, if it can be determined that the reason of a decrease in the degree of correlation of the measured data of MFB is a thermal strain error, the ECU 40 proceeds to step 114 to permit the continuance of the SA-CA10 feedback control and the CA50 feedback control.

If, on the other hand, the determination results of step 120 is affirmative ($D1 ≥ D1_{th}$), that is, if it can be determined that the reason of a decrease in the degree of correlation of the measured data of MFB is noise, the ECU 40 proceeds to step 122. In step 122, the ECU 40 determines that malfunction, such as poor connection of a ground wire, arises at the electric circuit of the in-cylinder pressure sensor 30, and executes the processing to turn on the MIL 46. The ECU 40 then proceeds to step 124. In step 124, the ECU 40 suspends the SA-CA10 feedback control and the CA50 feedback control.

In the present embodiment, the SA-CA10 feedback control and CA50 feedback control are executed per cylinder during lean-burn operation, the results of these feedback controls (that is, a correction amount that is based on the feedback control) is reflected in the next combustion cycle of the same cylinder. The processing in present step 124 is, more specifically, processing to stop these feedback controls by maintaining a correction amount for the fuel injection amount that is based on the SA-CA10 feedback control and a correction amount for the spark timing that is based on the CA50 feedback control at the previous values thereof, respectively (more specifically, values calculated in the previous combustion cycle), and not reflecting, in the respective correction amounts, the measured CA10 and the measured CA50 calculated in the current combustion cycle. Note that, PI control is utilized as an example of the aforementioned feedback control performed as described with reference to FIG. 3. That is, an I-term (integral term) that utilizes a cumulative difference between a target vale (target SA-CA10 or the like) and a measured value (measured SA-CA10 or the like) is included in these feedback controls. Accordingly, in an example of utilizing the aforementioned difference in a past combustion cycle in order to calculate an I-term when resuming feedback control, it is desirable to ensure that a value in a combustion cycle in which noise is detected is not included.

According to the above described processing of the routine shown in FIG. 8, the measured data of MFB before and after performing the first LPF are calculated utilizing output signals of the in-cylinder pressure sensor 30 before and after performing the first LPF, respectively. Further, the first correlation index value α and the second correlation index value β are respectively calculated based on the calculated measured data and reference data at the same operating condition. Furthermore, when it is determined that, because the first correlation index value α is less than the first determination value $α_{th1}$, the measured data is affected by the influence of noise or thermal strain, the degree of correlation between the measured data after performing the first LPF and the measured data before performing the first LPF (hereunder, referred to as a "first correlation degree") is evaluated based on the difference D1 (=α−β). Specifically, it is determined whether or not the first correlation degree is lower than a first degree by determining whether or not the difference D1 is greater than or equal to the determination value $D1_{th}$. As already described, in an example of being affected by the influence of noise, the difference D1 becomes greater than that in an example of being affected by the influence of thermal strain. Therefore, the above described processing makes it possible to determine an example in which measured data of MFB is affected by the influence of noise while being distinguished from an example of being affected by the influence of thermal strain. Further, in an example of being affected by the influence of noise, feedback controls that utilize the measured data of MFB (that is, the SA-CA10 feedback control and the CA50 feedback control) are suspended. By this means, the measured CA10 or the measured CA50 in the current combustion cycle with respect to which there is a possibility that an error has arisen due to noise are prohibited from being reflected in the respective feedback controls. It is thereby possible to avoid a situation in which the accuracy of engine control deteriorates due to utilization of the aforementioned measured CA10 or measured CA50. As a result, the robustness of the engine control can be improved.

In addition, according to the processing of the routine, when detecting the influence of noise by utilizing the difference D1 that corresponds to the "first correlation degree", the MIL 46 is turned on. Thus, malfunction of the electric circuit of the in-cylinder pressure sensor 30 can be notified to the driver of the vehicle.

In the above described first embodiment, by determining whether or not the difference D1 between the first correlation index value α and the second correlation index value β is greater than or equal to the determination value $D1_{th}$, it is determined whether or not the "first correlation degree" defined as described above is lower than a "first degree". However, a method for determination as to whether or not the "first correlation degree" is lower than the "first degree" is not limited to the aforementioned example, and may be, for example, an example of being executed using the following method shown in FIG. 10A to FIG. 12.

Figure 10A:
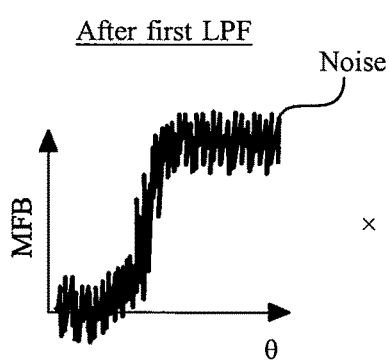
FIG. 10A and FIG. 10B are views showing the respective measured data of MFB that are affected by the influence of noise while comparing the data before performing the first LPF with the data after performing the first LPF.
Figure 10B:
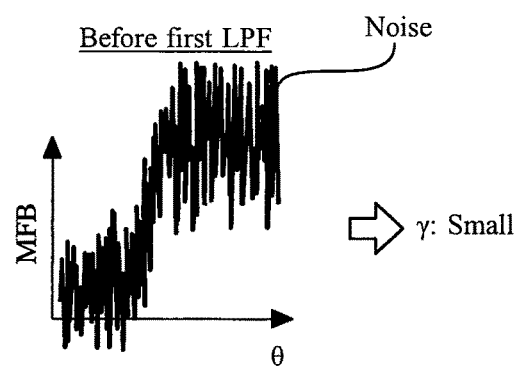
Figure 11A:
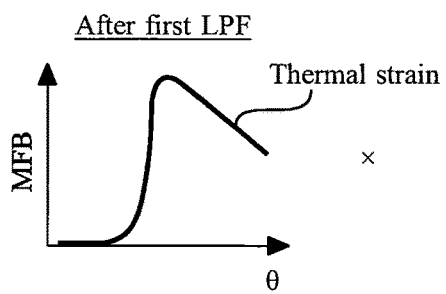
FIG. 11A and FIG. 11B are views showing the respective measured data of MFB that are affected by the influence of thermal strain while comparing the data before performing the first LPF with the data after performing the first LPF.
Figure 11B:
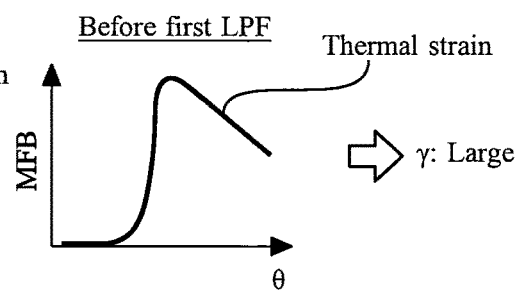

FIG. 10A and FIG. 10B are views showing the respective measured data of MFB that are affected by the influence of noise while comparing the data before performing the first LPF with the data after performing the first LPF. More specifically, FIG. 10A and FIG. 10B show that the level of noise superimposed on the measured data has decreased as a result of performing the first LPF. On the other hand, FIG. 11A and FIG. 11B are views showing the respective measured data of MFB that are affected by the influence of thermal strain while comparing the data before performing the first LPF with the data after performing the first LPF.

Here, a correlation index value that indicates the degree of correlation between measured data of MFB after performing the first LPF and measured data of MFB before performing the first LPF is referred to as a "third correlation index value γ". If measured data is affected by the influence of noise as shown in FIG. 10A and FIG. 10B, the third correlation index value γ that is defined as above becomes small due to a reason that the measured data of MFB largely changes before and after performing the first LPF. If, on the other hand, measured data is affected by the influence of thermal strain as shown in FIG. 11A and FIG. 11B, the third correlation index value γ becomes large since the third correlation index value γ does not change substantially. Therefore, by properly setting in advance a determination value $γ_{th}$ (positive value) as a value for discriminating a third correlation index value γ that is obtained in an example in which measured data is affected by the influence of noise from a third correlation index value γ that is obtained in an example in which measured data is affected by the influence of thermal strain, it can be determined whether or not the "first correlation degree" is less than the "first degree" by also determining whether or not the third correlation index value γ is less than the determination value $γ_{th}$.

Figure 12:
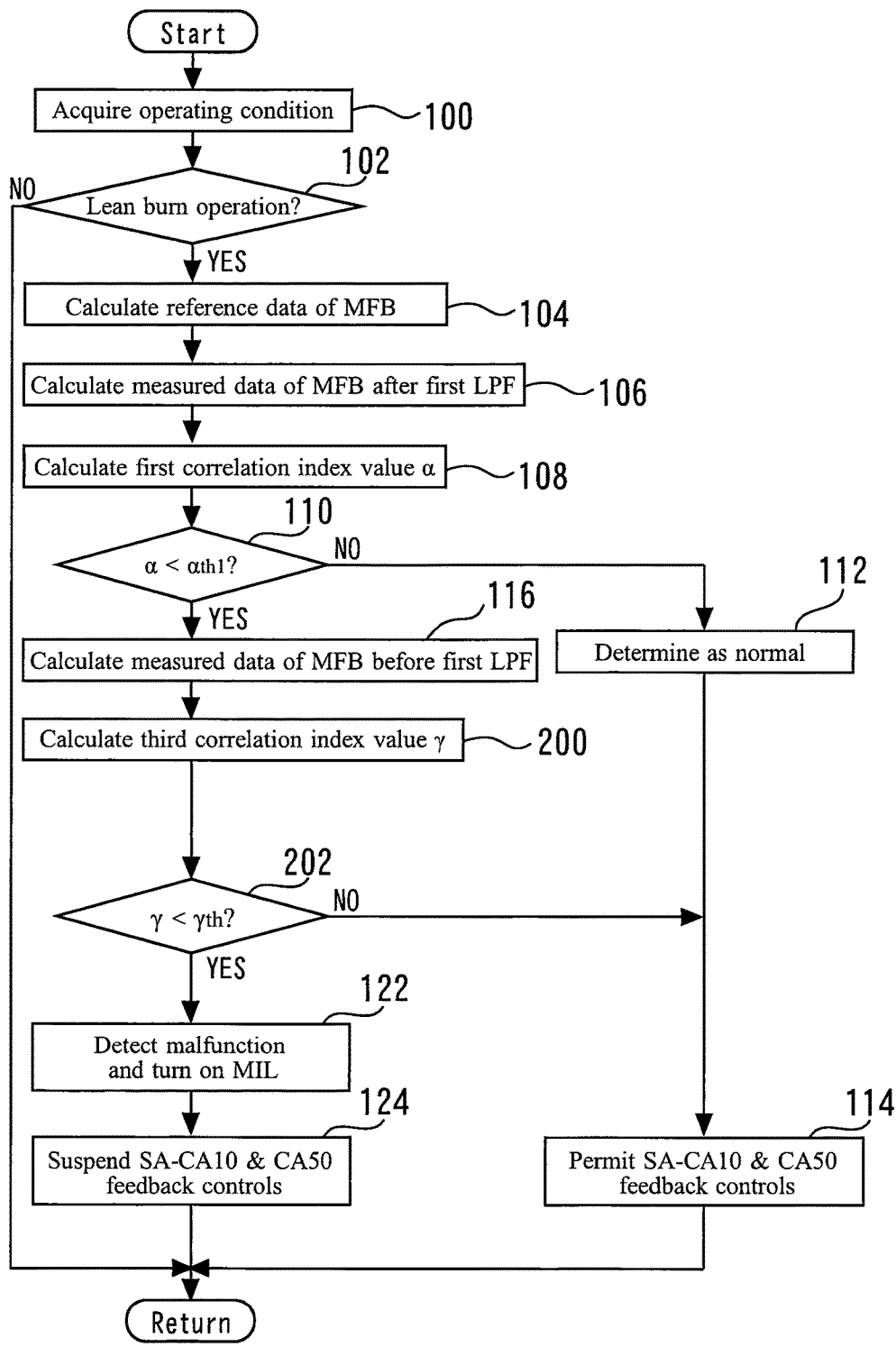
FIG. 12 is a flowchart illustrating a routine that the ECU executes in a modification of the first embodiment of the present disclosure.

FIG. 12 is a flowchart illustrating a routine that the ECU 40 executes in a modification of the first embodiment of the present disclosure. Note that, in FIG. 12, steps that are the same as steps shown in FIG. 8 in the first embodiment are denoted by the same reference numerals, and a description of those steps is omitted or simplified.

In the routine shown in FIG. 12, after determining in step 110 that the first correlation index value α is less than the first determination value $α_{th1}$, the ECU 40 calculates, in step 116, the measured data of MFB before performing the first LPF and proceeds to step 200. In step 200, with the measured data before and after performing the first LPF calculated respectively in steps 106 and 116, the third correlation index value γ is calculated using the aforementioned equation (5) by taking as an object the evaluation period T.

Next, the ECU 40 proceeds to step 202. In step 202, the ECU 40 determines whether or not the third correlation index value γ is less than a determination value $γ_{th}$. As described above, the determination value $γ_{th}$ used in present step 202 is set in advance as a value for discriminating a third correlation index value γ that is obtained in an example of being affected by the influence of noise from a third correlation index value γ that is obtained in an example of being affected by the influence of thermal strain.

If the determination results of step 202 is negative ($γ≥γ_{th}$), it can be judged that the degree of correlation between the measured data of MFB before and after performing the first LPF does not change substantially due to the fact that the influence of thermal strain is present. The ECU 40 then proceeds to step 114 to permit the continuance of the SA-CA10 feedback control and the CA50 feedback control.

If, on the other hand, the determination results of step 202 is affirmative ($γ<γ_{th}$), it can be judged that the degree of correlation between the measured data of MFB before and after performing the first LPF has decreased due to the fact that the influence of noise is present. The ECU 40 then proceeds to step 122 to execute the processing to turn on the MIL 46. Further, the ECU 40 proceeds to step 124 to suspend the SA-CA10 feedback control and the CA50 feedback control.

As described so far with reference to FIG. 10A to FIG. 12, a determination as to whether or not the "first correlation degree" is less than the "first degree" may be performed using a method for directly comparing the measured data after performing the first LPF and the measured data before performing the first LPF without using the reference data of MFB.

Moreover, in the above described first embodiment, when it is determined in a certain combustion cycle that the first correlation index value α for measured data of MFB after performing the first LPF is less than the first correlation index value $α_{th1}$ and the difference D1 is greater than or equal to the determination value $D1_{th}$, the occurrence of malfunction of the electric circuit of the in-cylinder pressure sensor 30 is determined and the MIL 46 is turned on. However, this kind of malfunction determination on the in-cylinder pressure sensor 30 may be performed such that a provisional determination on malfunction is made in each combustion cycle each time the first correlation index value α is less than the first correlation index value $\alpha_{th1}$ and the difference D1 is greater than or equal to the determination value $D1_{th}$. The malfunction determination may be then performed that the determination that malfunction arises at the electric circuit of the in-cylinder pressure sensor 30 is finalized when the number (number of combustion cycles) of provisional determinations becomes greater than or equal to a predetermined number. Further, a configuration may be adopted such that, when such a final determination has been made, the MIL 46 is turned on and the SA–CA10 feedback control and the CA50 feedback control are suspended. By performing this kind of processing, malfunction of the electric circuit of the in-cylinder pressure sensor 30 can be determined more accurately while being distinguished from an example on which noise is superimposed by an incidental factor. Note that the above described processing that malfunction determination is finalized when the number of provisional determinations becomes larger than or equal to a predetermined number also applies with respect to other malfunction determinations in second embodiment described later.

Note that, in the above described first embodiment, the ECU 40 that is programmed to execute the processing in step 106 and execute the processing in step 116 corresponds to the "controller" according to the present disclosure. In addition, the ECU 40 that is programmed to execute the SA–CA10 feedback control and the CA50 feedback control and execute the processing in step 124 when the determination results of both steps 110 and 120 are affirmative corresponds to the "controller" according to the present disclosure. Further, the ECU 40 that is programmed to execute the processing in step 108 and execute the processing in step 120 corresponds to the "controller" according to the present disclosure. Moreover, the fuel injection valve 26 and the ignition device 28 correspond to the "actuator" according to the present disclosure. Furthermore, the ECU 40 that is programmed to execute the processing in step 122 corresponds to the "controller" according to the present disclosure.

Second Embodiment

Next, a second embodiment of the present disclosure will be described with reference to FIG. 13.

[Method for Malfunction Detection, and Countermeasure at Time of Malfunction Detection According to Second Embodiment]

In the above described first embodiment, it is determined that, when the first correlation index value α is less than the first correlation index value $\alpha_{th1}$ and the difference D1 (=α−β) is less than the determination value $D1_{th}$, the influence of thermal strain on CA10 and CA50 is small, and suspending the SA–CA10 feedback control and the CA50 feedback control is not performed.

In general, between an in-cylinder pressure sensor and a wall surface of a combustion chamber that surrounds the sensor, a seal part (not shown in the drawings) is provided that seals a gap between the in-cylinder pressure sensor and the aforementioned wall surface so that gas inside the cylinder does not pass through the gap to leak outside. If sealing function of this kind of the seal part declines, a high temperature combustion gas enters into a part on the inner side relative to the seal part. As a result, the amount of heat that the sensor tip part for sensing in-cylinder pressure receives from combustion gas increases. Because of this, if sealing function of the seal part declines (that is, if malfunction arises at the seal part), a thermal strain error increases. If a thermal strain error excessively increases due to malfunction of the seal part, the influence of thermal strain on CA10 and CA50 becomes too large to ignore. Therefore, the influence of thermal strain on the SA–CA10 feedback control and the CA50 feedback control increases.

Accordingly, in the present embodiment, when the first correlation index value α is less than the first correlation index value $\alpha_{th1}$ and the difference D1 is less than the determination value $D1_{th}$, it is further determined whether or not the first correlation index value α is greater than or equal to a second determination value $\alpha_{th2}$ that is less than the first correlation index value $\alpha_{th1}$.

When the first correlation index value α is greater than or equal to the second determination value $\alpha_{th2}$ ($\alpha_{th2} \leq \alpha < \alpha_{th1}$), it can be judged that the degree of a decrease in the correlation of MFB data due to the influence of thermal strain is relatively low, because although the first correlation index value α is less than the first correlation index value $\alpha_{th1}$, the first correlation index value α is greater than or equal to the second determination value $\alpha_{th2}$.

On the other hand, when the first correlation index value α is less than the second determination value $\alpha_{th2}$ ($\alpha < \alpha_{th2} < \alpha_{th1}$), it can be judged that the degree of a decrease in the correlation of MFB data due to the influence of thermal strain is relatively high, because the first correlation index value α is less than the second determination value $\alpha_{th2}$. Therefore, it is determined in the present embodiment that malfunction arises at the seal part. Further, the MIL 46 is turned on to notify the driver of the malfunction of the seal part, and the SA–CA10 feedback control and the CA50 feedback control are suspended.

(Specific Processing in Second Embodiment)

Figure 13:
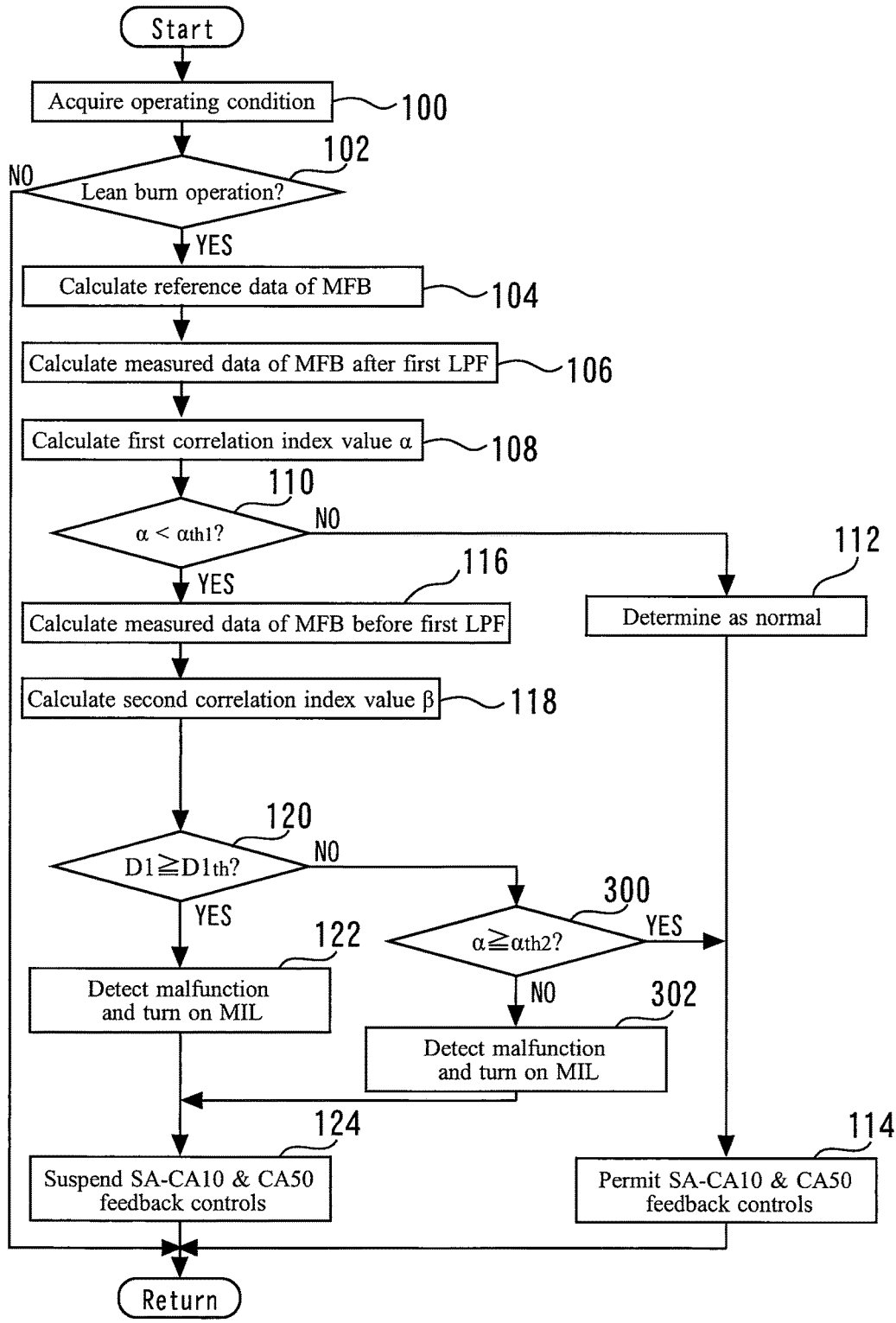
FIG. 13 is a flowchart illustrating a routine that the ECU executes in a second embodiment of the present disclosure.

FIG. 13 is a flowchart illustrating a routine that the ECU 40 executes in the second embodiment of the present disclosure. Note that, in FIG. 13, steps that are the same as steps shown in FIG. 8 in the first embodiment are denoted by the same reference numerals, and a description of those steps is omitted or simplified.

In the routine shown in FIG. 13, the ECU 40 proceeds to step 300 after determining in step 120 that the difference D1 is less than the determination value $D1_{th}$. In step 300, the ECU 40 determines whether or not the first correlation index value α is greater than or equal to the second determination value $\alpha_{th2}$. The second determination value $\alpha_{th2}$ is set in advance as a value for determining whether or not a decline in the correlation of MFB data that is caused by the influence of thermal strain is large due to malfunction of the seal part.

After determining in step 300 that the first correlation index value α is greater than or equal to the second determination value $\alpha_{th2}$, the ECU 40 proceeds to step 114 to permit execution of the SA–CA10 feedback control and the CA50 feedback control. On the other hand, after determining in step 300 that the first correlation index value α is less than the second determination value $\alpha_{th2}$, the ECU 40 proceeds to step 302 to determine that malfunction arises in sealing function of the seal part and turn on the MIL 46. The ECU 40 then proceeds to step 126 to suspend the SA–CA10 feedback control and the CA50 feedback control.

According to the above described processing of the routine shown in FIG. 13, by evaluating the degree of correlation between the measured data of MFB before performing the first LPF and the measured data of MFB after performing the first LPF, the measured data of MFB can be determined to be affected by the influence of noise while distinguishing this from an example of being affected by the influence of thermal strain, and, in addition to this, the presence or absence of malfunction of the seal part can be determined.

Further, when it is determined that malfunction of the seal part has occurred, appropriate countermeasures (that is, suspension of the SA-CA10 feedback control and CA50 feedback control) can be performed.

In the above described second embodiment, explanation has been made for an example in which the processing utilizing the third correlation index value γ according to the present embodiment (steps 300 and 302) is combined with the processing of the routine shown in FIG. 9 according to the first embodiment. However, the processing utilizing the third correlation index value γ may be executed in combination with the processing of the routine shown in FIG. 12 according to the modification of the first embodiment. More specifically, the aforementioned processing (steps 300 and 302) may be performed when the determination results of step 202 is negative.

Note that, in the above described second embodiment, the ECU 40 that is programmed to execute the processing in step 302 corresponds to the "controller" according to the present disclosure.

Third Embodiment

Next, a third embodiment of the present disclosure will be described with reference to FIG. 14 to FIG. 16.
[Method for Malfunction Detection, and Countermeasure at Time of Malfunction Detection According to Third Embodiment]

The present embodiment differs from the first embodiment with respect to a point that, when a determination that measured data of MFB is affected by the influence of noise is made by the processing of the first embodiment, the following processing is executed as well as the processing of the first embodiment.

The present embodiment is based on the premise that the output signal of the in-cylinder pressure sensor 30 is used as follows. FIG. 14 is a view showing frequency bands Δf1 and Δf2 of the output signal of the in-cylinder pressure sensor 30 that are used for engine control and detection processing according to the third embodiment of the present disclosure. In the present embodiment, the output signal of the in-cylinder pressure sensor 30 is used, for example, for the SA-CA10 feedback control and the CA50 feedback control that use the specified fraction combustion points CA10 and CA50, respectively, (as shown "CPS control" in FIG. 14), and for detection processing for knock in the internal combustion engine 10.

Figure 14:
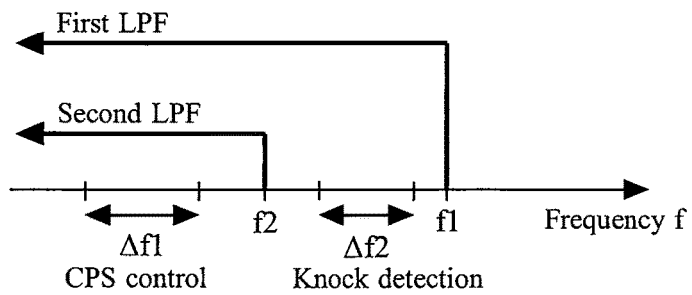
FIG. 14 is a view showing frequency bands $\Delta f1$ and $\Delta f2$ of the output signal of an in-cylinder pressure sensor that are used for engine control and detection processing according to a third embodiment of the present disclosure.

A first frequency band Δf1 in FIG. 14 shows a frequency band of frequency components of the output signal of the in-cylinder pressure sensor 30 used for the CPS control. That is, in the present embodiment, measured data of MFB after performing the second LPF is used for calculating measured values of the specified fraction combustion points CA10 and CA50 used for the CPS control.

On the other hand, frequency components of the output signal of the in-cylinder pressure sensor 30 in a second frequency band Δf2 on the higher frequency side of the first frequency band Δf1 are used for the detection of a knock. In the present embodiment, the first cut-off frequency f1 is higher than the upper limit of the second frequency band Δf2.

Moreover, in the present embodiment, with a second cut-off frequency f2 that is lower than the first cut-off frequency f1, the LPF section 40a is configured to perform, with respect to the output signal of the in-cylinder pressure sensor 30, not only the aforementioned the first LPF but also a second low-pass filtering (hereunder, referred to as a "second LPF") that attenuates frequency components that are higher than the second cut-off frequency f2. Furthermore, the ECU 40 is configured to individually receive an output signal of the in-cylinder pressure sensor 30 after performing the second LPF, in addition to an output signal of the in-cylinder pressure sensor 30 before performing the first LPF and the second LPF and an output signal of the in-cylinder pressure sensor 30 after performing the first LPF. The second cut-off frequency f2 is provided in a frequency band located between the first frequency band Δf1 and the second frequency band Δf2. Note that, although the second LPF is herein realized by the LPF section 40a with a digital filtering technique, the second LPF may be realized with an analog filtering technique.

A frequency band on which noise is mainly superimposed is not uniform and may change depending on the superimposed noise. If the frequency band on which noise is mainly superimposed is from the second cut-off frequency f2 to the first cut-off frequency f1, this noise does not greatly affect the CPS control although there is a possibility that the noise may greatly affect the detection processing for knock. If, on the other hand, the frequency band on which noise is mainly superimposed is lower than or equal to the second cut-off frequency f2, there is a possibility that this noise may greatly affect the CPS control although the noise does not greatly affect the detection processing for knock. Consequently, if the CPS control and the detection processing for knock are uniformly suspended when it is detected by the method of the first embodiment or the like that the measured data of MFB after performing the first LPF is affected by the influence of noise, there is a possibility that a control or a detection processing which is not essentially required to be suspended may be caused to be suspended.
(Identification of Frequency Band on which Noise is Mainly Superimposed)

Figure 15A:
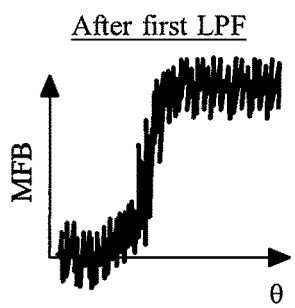
FIG. 15A to FIG. 15C are views for explaining the influence, on measured data of MFB after performing a second LPF, of the difference of a frequency band on which noise is superimposed when it is determined that measured data of MFB after performing the first LPF is affected by the influence of noise.
Figure 15B:
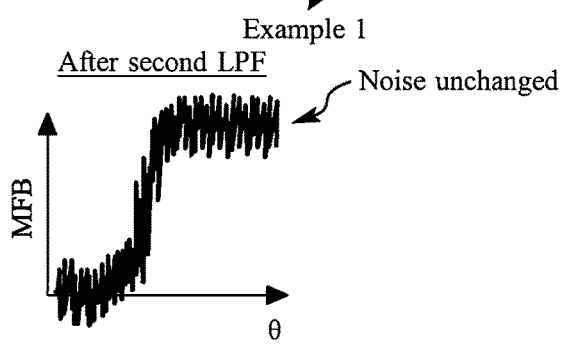
Figure 15C:
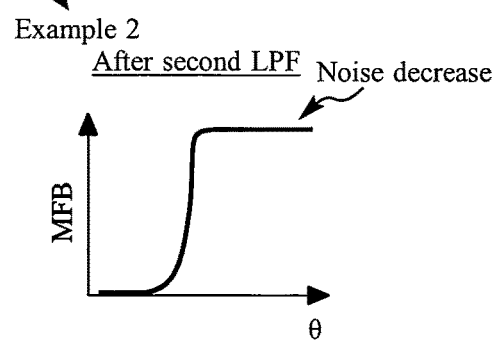

FIG. 15A to FIG. 15C are views for explaining the influence, on measured data of MFB after performing the second LPF, of the difference of a frequency band on which noise is superimposed when it is determined that measured data of MFB after performing the first LPF is affected by the influence of noise. FIG. 15A shows a waveform of measured data of MFB after performing the first LPF that is obtained when, by the aforementioned processing of the first embodiment, the first correlation index value α is less than the first determination value $α_{th1}$ and the difference D1 (=α−β) is greater than or equal to the determination value $D1_{th}$.

On the other hand, FIG. 15B shows an example 1 in which noise similar to that on the measured data after performing the first LPF shown in FIG. 15A remains on the measured data after performing the second LPF. If a frequency band on which noise is mainly superimposed is lower than or equal to the second cut-off frequency f2, a waveform that is not greatly different from a waveform after performing the first LPF, such as a waveform of the measured data of MFB shown as the example 1, is obtained even when the second LPF is also performed.

Here, a correlation index value that indicates the degree of correlation between measured data of MFB after performing the second LPF and the reference data is referred to as a "fourth correlation index value δ". According to the fourth correlation index value δ that is defined as above, a difference D2 (=δ−α) that is obtained by subtracting the first correlation index value α from the fourth correlation index value δ becomes sufficiently small-because waveforms of measured data before and after performing the second LPF do not greatly change in the example 1 shown in FIG. 15B.

FIG. 15C shows an example 2 in which noise has been sufficiently removed from the measured data of MFB by performing the second LPF. If a frequency band on which noise is mainly superimposed is from the second cut-off frequency f2 to the first cut-off frequency f1, noise is sufficiently removed by performing the second LPF as in the waveform of the measured data of MFB shown in the example 2. As a result of this, the fourth correlation index value $\delta$ becomes greater than the first correlation index value $\alpha$ because the measured data of MFB after performing the second LPF comes close to the reference data. The difference D2 therefore becomes large. Note that it can be said that, because noise which is superimposed on a frequency band from the second cut-off frequency f2 to the first cut-off frequency f1 is removed by performing the second LPF, the difference D2 ($=\delta-\alpha$) indicates a positive value without depending on the level of noise that is superimposed on the frequency band.

Based on the foregoing facts, by properly setting in advance a determination value $D2_{th}$ (positive value) as a value for discriminating a difference D2 that is obtained in an example where a frequency band on which noise is mainly superimposed is lower than or equal to the second cut-off frequency f2 from a difference D2 that is obtained in an example where a frequency band on which noise is mainly superimposed is from the second cut-off frequency f2 to the first cut-off frequency f1, a frequency band on which noise is mainly superimposed can be identified based on a comparison result between the difference D2 and the determination value $D2_{th}$.

(Countermeasures Against Noise Utilizing Identification Results of Frequency Band on which Noise is Mainly Superimposed)

In the present embodiment, when the first correlation index value $\alpha$ is less than the first correlation index value $\alpha_{th1}$ and the difference D1 is greater than or equal to the determination value $D1_{th}$ (that is, when it is determined that measured data of MFB is affected by the influence of noise), it is further determined whether or not the difference D2 ($=\delta-\alpha$) is greater than or equal to the determination value $D2_{th}$. If the difference D2 is greater than or equal to the determination value $D2_{th}$, the detection processing for knock that utilizes frequency components of an output signal of the in-cylinder pressure sensor 30 in a frequency band on which it is conceivable that noise is mainly superimposed (that is, a frequency band from the second cut-off frequency f2 to the first cut-off frequency f1) is suspended. Further, if the difference D2 is greater than or equal to the determination value $D2_{th}$, the SA–CA10 feedback control and the CA50 feedback control are not suspended contrary to the first embodiment although the difference D1 is greater than or equal to the determination value $D1_{th}$.

On the other hand, when difference D2 is less than the determination value $D2_{th}$, the SA–CA10 feedback control and the CA50 feedback control that utilize frequency components of an output signal of the in-cylinder pressure sensor 30 in a frequency band on which it is conceivable that noise is mainly superimposed (that is, a frequency band that is lower than or equal to the second cut-off frequency f2) are suspended without suspending the detection processing for knock.

(Specific Processing in Third Embodiment)

Figure 16:
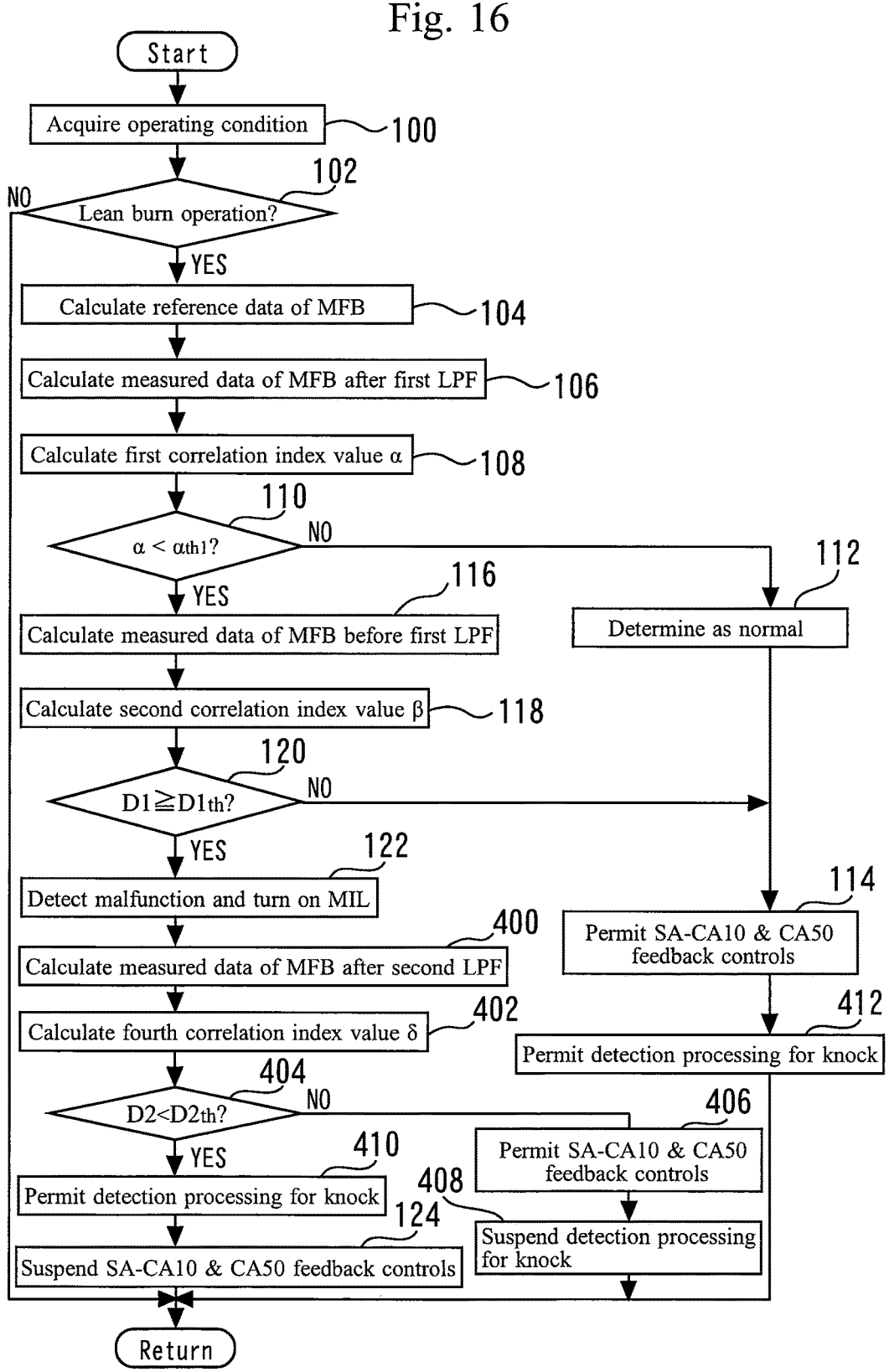
FIG. 16 is a flowchart illustrating a routine that the ECU executes in the third embodiment of the present disclosure.

FIG. 16 is a flowchart illustrating a routine that the ECU 40 executes in the third embodiment of the present disclosure. Note that, in FIG. 16, steps that are the same as steps shown in FIG. 8 in the first embodiment are denoted by the same reference numerals, and a description of those steps is omitted or simplified.

In the routine shown in FIG. 16, after determining in step 120 that the difference D1 is greater than or equal to the determination value $D1_{th}$, the ECU 40 turns on the MIL 46 in step 122 and then proceeds to step 400. In step 400, measured data of MFB is calculated in accordance with the above described equation (3) based on the measured data of the in-cylinder pressure after performing the second LPF out of the measured data of the in-cylinder pressure that is acquired using the in-cylinder pressure sensor 30 in the current combustion cycle.

Next, the ECU 40 proceeds to step 402. In step 402, with the reference data of MFB calculated in step 104 and the measured data after performing the second LPF calculated in step 400, the fourth correlation index value $\delta$ is calculated using the aforementioned equation (5) by taking as an object the evaluation period T.

Next, the ECU 40 proceeds to step 404. In step 404, the ECU 40 determines whether or not the difference D2 ($=\delta-\alpha$) between the fourth correlation index value $\delta$ calculated in step 402 and the first correlation index value $\alpha$ calculated in step 108 is less than a predetermined determination value $D2_{th}$. As described above, the determination value $D2_{th}$ used in present step 404 is set in advance as a value for discriminating a difference D2 that is obtained in an example where a frequency band on which noise is mainly superimposed is lower than or equal to the second cut-off frequency f2 from a difference D2 that is obtained in an example where a frequency band on which noise is mainly superimposed is from the second cut-off frequency f2 to the first cut-off frequency f1.

If the determination results of step 404 is negative (D2≥$D2_{th}$), that is, if it can be determined that the frequency band on which noise is mainly superimposed is a frequency band from the second cut-off frequency f2 to the first cut-off frequency f1, the ECU 40 proceeds to step 406 to permit the continuance of the SA–CA10 feedback control and the CA50 feedback control. The ECU 40 then proceeds to 408 to suspend the detection processing for knock that utilizes the output signal of the in-cylinder pressure sensor 30 in the current combustion cycle.

If, on the other hand, the determination results of step 404 is affirmative (D2<$D2_{th}$), that is, if it can be determined that the frequency band on which noise is mainly superimposed is a frequency band that is lower than or equal to the second cut-off frequency f2, the ECU 40 proceeds to 410 to permit the detection processing for knock. The ECU 40 then proceeds to step 124 to suspend the SA–CA10 feedback control and the CA50 feedback control. Note that, in step 412, the detection processing for knock is permitted also when the determination results of step 110 is negative ($\alpha \geq \alpha_{th}$) or when the determination results of step 120 is negative (D1<$D1_{th}$).

According to the above described processing of the routine shown in FIG. 16, when it is determined, using the first correlation index value $\alpha$ and the difference D1, that the measured data of MFB after performing the first LPF is affected by the influence of noise, a degree of correlation between the measured data after performing the second LPF and the measured data after performing the first LPF (hereunder, referred to as a "second correlation degree") is evaluated based on the difference D2 ($=\delta-\alpha$). Specifically, it is determined whether or not the second correlation degree is lower than a predetermined second degree by determining whether or not the difference D2 is greater than or equal to a predetermined determination value $D2_{th}$. In the present routine, a frequency band on which noise is mainly superimposed can be identified by additionally performing this kind of processing. In addition, by utilizing the identification results, determination processing or engine control that should be truly suspended upon detection of noise can be discriminated accurately. Consequently, an unnecessary change of engine control or detection processing can be suppressed.

In the above described third embodiment, it is determined whether or not the "second correlation degree" that is defined as described above is lower than the "second degree" by determining whether or not the difference D2 between the fourth correlation index value δ and the first correlation index value α is greater than or equal to the determination value $D2_{th}$. However, a determination as to whether or not the "second correlation degree" is lower than the "second degree" is not limited to the aforementioned example. More specifically, the determination as to whether or not the "second correlation degree" is lower than the "second degree" may be performed by calculating a correlation index value that directly indicates a degree of correlation between measured data after performing the second LPF and measured data after performing the first LPF and evaluating the magnitude of the correlation index value.

Moreover, in the above described third embodiment, a frequency band on which noise is mainly superimposed is identified by utilizing two low-pass filter that perform the first LPF and the second LPF, respectively. However, the number of low-pass filters which are used for identifying this kind of frequency band is not limited to two and may be three or more.

In the above described third embodiment, explanation has been made for an example in which the aforementioned processing in steps 400 to 412 is combined with the processing of the routine shown in FIG. 8 according to the first embodiment. However, the processing of the present embodiment may be executed in combination with the processing of the routine shown in FIG. 12 according to the modification of the first embodiment or the processing of the routine shown in FIG. 13 according to the second embodiment.

Note that, in the above described third embodiment, the ECU 40 that is programmed to execute the processing in step 400 corresponds to the "controller" according to the present disclosure. In addition, the ECU 40 that is programmed to execute the processing in step 404 corresponds to the "controller" according to the present disclosure. Further, the ECU 40 that is programmed to execute the processing in step 408 when the determination results of step 404 is negative corresponds to the "controller" according to the present disclosure.

In the above described first to third embodiments, the first correlation index value α that uses MFB data after performing the first LPF is utilized to determine whether or not measured data of MFB is normal (see steps 110 and 300). However, a correlation index value that is utilized for this kind of determination may be the second correlation index value β that uses MFB data before performing the first LPF.

Moreover, in the first to third embodiments, when the first correlation index value α is less than the first correlation index value $α_{th1}$ and the difference D1 (=α−β) is greater than or equal to the determination value $D1_{th}$, by maintaining the respective correction amounts of the SA–CA10 feedback control and the CA50 feedback control at the previous values thereof, reflection, in the respective feedback controls, of the measured CA10 or measured CA50 in a combustion cycle in which the first and second correlation index values α and β that are used for the determination are calculated is prohibited. However, the manner of this kind of prohibition is not limited to an example that maintains the previous values of the correction amount, and for example, a configuration may be adopted in which the respective correction amounts are set to zero. If the correction amounts are maintained at the previous values, although feeding back of the measured CA10 and CA50 in the current combustion cycle is prohibited, adjustments of a fuel injection amount and a spark timing are continued using past feedback results. On the other hand, if the correction amount is set to zero, utilization of a past feedback result is itself also prohibited. Further, a configuration may also be adopted that rather than prohibiting the aforementioned feedback controls, performs the feedback controls while lowering each feedback gain. This technique corresponds to an example in which the degree to which the measured CA10 and CA50 in the current combustion cycle is reflected in the SA–CA10 feedback control and the CA50 feedback control is lowered in comparison to when the first correlation index value α is greater than or equal to the first correlation index value $α_{th1}$. The modification described above is similarly applied with respect to when the engine control is changed as a result of the determination results of step 202 in FIG. 12 being affirmative, or when the engine control is changed as a result of the determination results of step 300 in FIG. 13 being negative, or when the engine control is changed as a result of the determination results of step 404 in FIG. 16 being affirmative.

Moreover, in the third embodiment, when a determination that the difference D2 is greater than or equal to the determination value $D2_{th}$ is made, the detection processing for knock is suspended. Thus, reflection, in the detection processing for knock, of a component that is of an output signal of the in-cylinder pressure sensor 30 in a combustion cycle in which measured data of MFB used for the determination (i.e., MFB data before and after performing the first LPF and MFB data after performing the second LPF) are calculated and that is of the output signal of the in-cylinder pressure sensor 30 in a frequency band from the second cut-off frequency f2 to the first cut-off frequency f1 is prohibited. However, the "controller" according to the present disclosure may lower the degree of reflection, in the detection processing for knock" of a component of an output signal of the in-cylinder pressure sensor 30 in the aforementioned frequency band in comparison to the degree of reflection provided when the first correlation index value α or the second correlation index value β is greater than or equal to the first determination value $α_{th1}$, instead of prohibiting a predetermined detection processing, such as the detection processing for knock, with the aforementioned manner.

Moreover, in the first to third embodiments, both of turning on the MIL 46 accompanying the various malfunction determinations and suspending the SA–CA10 feedback control and the CA50 feedback control are performed. However, instead of this kind of example, only a change of engine control, such as suspending the SA–CA10 feedback control and the CA50 feedback control, may be performed without raising an alarm, such as turning on the MIL 46.

Moreover, in the first to third embodiments, when the various malfunction determinations are performed, the MIL 46 is turned on to notify the driver of malfunction concerning the in-cylinder pressure sensor 30. However, the "controller" according to the present disclosure is not limited to the aforementioned example, and may, for example, notify the driver of malfunction utilizing beep sound or voice.

Moreover, in the first to third embodiments, a cross-correlation function is used to calculate correlation index values α, β, γ and δ. However, a calculation method for the "correlation index value" according to the present disclosure is not necessarily limited to a method using a cross-correlation function. That is, the calculation method may use, for example, a value obtained by adding together the squares of differences (a so-called "residual sum of squares") between the various measured data and reference data corresponding therewith for MFB at the same crank angles while taking a predetermined evaluation period as an object. When the residual sum of squares is utilized, the value decreases as the degree of correlation increases. More specifically, a value that becomes larger as the degree of correlation increases is used for the "correlation index value" according to the present disclosure. Accordingly, where the residual sum of squares is utilized, it is sufficient to use the "correlation index value" as an inverse number of the residual sum of squares.

Moreover, in the first to third embodiments, various reference data are calculated using the respective control target values as shown in FIG. 9. However, in the present disclosure, a method for calculating the "reference data" of MFB based on an engine operating condition is not limited to the aforementioned example, and may be, for example, one that utilizes a known method for using a Wiebe function to calculate MFB.

Further, although the SA–CA10 feedback control and the CA50 feedback control are illustrated in the first to third embodiments, "engine control that controls an actuator of the internal combustion engine based on a measured value of the specified fraction combustion point" according to the present disclosure is not limited to the above described feedback controls. That is, the specified fraction combustion point CAX can be, for example, used for determining torque fluctuations or misfiring of the internal combustion engine. Accordingly, control of a predetermined actuator that is performed upon receiving a result of the aforementioned determination is also included in the above described engine control. Further, the specified fraction combustion point CAX that is used as an object of "engine control" in the present disclosure is not limited to CA10 and CA50, and may be an arbitrary value that is selected from within a range from CA0 to CA100, and for example may be CA90 that is the 90% combustion point. In addition, for example, a combination of a plurality of specified fraction combustion points CAX may be used, such as CA10 to CA50 that is a crank angle period from CA10 to CA50.

Furthermore, in the first to third embodiments, a configuration is adopted in which, at a time of lean-burn operation accompanied by implementation of the SA–CA10 feedback control and the CA50 feedback control, evaluation of the degree of correlation of MFB data and the like is performed based on the first correlation index value α and the like. However, on the premise that engine control based on a specified fraction combustion point CAX is performed, such evaluation is not limited to one performed at a time of lean-burn operation, and, for example, a configuration may be adopted in which the evaluation is performed at a time of the stoichiometric air-fuel ratio burn operation.

What is claimed is:

1. A control apparatus for an internal combustion engine, comprising:
    an in-cylinder pressure sensor configured to detect an in-cylinder pressure;
    a crank angle sensor configured to detect a crank angle; and
    a controller, the controller being programmed to:
    (a) perform, with respect to an output signal of the in-cylinder pressure sensor, a first low-pass filtering that attenuates frequency components that is higher than a first cut-off frequency;
    (b) calculate first measured data of mass fraction burned that is synchronized with crank angle, based on an output signal of the in-cylinder pressure sensor after performing the first low-pass filtering and a crank angle detected by the crank angle sensor;
    (c) calculate second measured data of mass fraction burned that is synchronized with crank angle, based on an output signal of the in-cylinder pressure sensor before performing the first low-pass filtering and a crank angle detected by the crank angle sensor;
    (d) calculate, based on the first measured data or the second measured data, a measured value of a specified fraction combustion point that is a crank angle at which mass fraction burned reaches a specified fraction, and execute engine control that controls an actuator of the internal combustion engine based on the measured value of the specified fraction combustion point;
    (e) calculate a first correlation index value that indicates a degree of correlation between the first measured data and reference data of mass fraction burned or calculate a second correlation index value that indicates a degree of correlation between the second measured data and the reference data, the reference data of mass fraction burned being based on an operating condition of the internal combustion engine;
    (f) determine whether or not a first correlation degree that indicates a degree of correlation between the first measured data and the second measured data is lower than a first degree; and
    (g) when a determination that the first correlation index value or the second correlation index value is less than a first determination value and the first correlation degree is lower than the first degree is made, prohibit reflection, in the engine control, of the measured value of the specified fraction combustion point in a combustion cycle in which the first and second measured data used for the determination are calculated, or lower a degree of the reflection in comparison to that when the first correlation index value or the second correlation index value is greater than or equal to the first determination value.

2. The control apparatus according to claim 1, wherein the controller is programmed to raise an alarm for malfunction concerning the in-cylinder pressure sensor when the determination that the first correlation index value or the second correlation index value is less than the first determination value and the first correlation degree is lower than the first degree is made.

3. The control apparatus according to claim 1, wherein the controller is programmed to:
    (h) perform, with respect to an output signal of the in-cylinder pressure sensor, a second low-pass filtering that attenuates frequency components that is higher than a second cut-off frequency that is lower than the first cut-off frequency;
    (i) calculate third measured data of mass fraction burned that is synchronized with crank angle, based on an output signal of the in-cylinder pressure sensor after performing the second low-pass filtering and a crank angle detected by the crank angle sensor; and (j) determine whether or not a second correlation degree that indicates a degree of correlation between the first measured data and the third measured data is lower than a second degree, wherein the engine control controls the actuator based on the measured value of the specified fraction combustion point that is calculated based on the third measured data instead of the first measured data or the second measured data, and wherein the controller is programmed, when a determination that the first correlation index value or the second correlation index value is less than the first determination value and the first correlation degree is lower than the first degree and the second correlation degree is lower than the second degree is made, to prohibit reflection, in a predetermined detection processing, of a component that is of an output signal of the in-cylinder pressure sensor in a combustion cycle in which the first, second and third measured data used for the determination are calculated and that is of the output signal of the in-cylinder pressure sensor in a frequency band from the second cut-off frequency to the first cut-off frequency, or to lower a degree of the reflection in comparison to that when the first correlation index value or the second correlation index value is greater than or equal to the first determination value.

4. The control apparatus according to claim 3, wherein the controller is programmed, when the determination that the first correlation index value or the second correlation index value is less than the first determination value and the first correlation degree is lower than the first degree and the second correlation degree is lower than the second degree is made, to permit reflection, in the engine control, of the measured value of the specified fraction combustion point in a combustion cycle in which the first, second and third measured data used for the determination are calculated, without lowering a degree of the reflection in comparison to that when the first correlation index value or the second correlation index value is greater than or equal to the first determination value.

5. The control apparatus according to claim 1, wherein the controller is programmed, when a determination that the first correlation index value or the second correlation index value is less than a second determination value that is smaller than the first determination value and the first correlation degree is greater than or equal to the first degree is made, to prohibit reflection, in the engine control, of the measured value of the specified fraction combustion point in a combustion cycle in which the first and second measured data used for the determination are calculated, or to lower a degree of the reflection in comparison to that when the first correlation index value or the second correlation index value is greater than or equal to the first determination value.

6. The control apparatus according to claim 1, wherein the controller is programmed to raise an alarm for malfunction concerning the in-cylinder pressure sensor when the first correlation index value or the second correlation index value is less than a second determination value that is smaller than the first determination value and the first correlation degree is greater than or equal to the first degree is made.

* * * * *